(12) United States Patent
Vitanov et al.

(10) Patent No.: US 7,734,583 B2
(45) Date of Patent: Jun. 8, 2010

(54) TRANSPARENT VIRTUAL MACHINE FOR MOBILE APPLICATIONS

(75) Inventors: Kamen Vitanov, Mississauga (CA); Jeffrey Christopher Rogers, Scarborough (CA); Timothy Allen Neil, Mississauga (CA)

(73) Assignee: Research in Motion Limited, Waterloo, Ontario (CA)

( * ) Notice: Subject to any disclaimer, the term of this patent is extended or adjusted under 35 U.S.C. 154(b) by 275 days.

(21) Appl. No.: 11/405,492

(22) Filed: Apr. 18, 2006

(65) Prior Publication Data

US 2007/0244926 A1    Oct. 18, 2007

(51) Int. Cl.
*G06F 7/00* (2006.01)
(52) U.S. Cl. .................................. 707/621; 707/609
(58) Field of Classification Search .................... None
See application file for complete search history.

(56) References Cited

U.S. PATENT DOCUMENTS 7,426,721 B1   9/2008 Saulpaugh et al.
2004/0060041 A1*  3/2004 Demsey et al. ............. 717/151
2005/0149990 A1*  7/2005 Fairhurst et al. ............ 725/136
2006/0047665 A1*  3/2006 Neil ............................ 707/10

OTHER PUBLICATIONS

"Blackberry Developer Journal" vol. 2, Issue 2, Jul. 2005.
"Windows Presentation Foundation Everywhere", http://theopensourcery.com/mswinpfe.htm.
http://www.pinstack.com/blackberryforums.

* cited by examiner

*Primary Examiner*—Pierre M Vital
*Assistant Examiner*—Truong V Vo

(57) ABSTRACT

The inclusion of metadata within an application description file allows a virtual machine to create an application descriptor file that may be registered with the mobile device operating system so that an icon associated with the application description file may be displayed in the main ribbon. Execution of an application defined by the application definition file may then be initiated by the selection, by the user, of the icon that is associated with the application definition file. This improves over the situation wherein execution of the application defined by the application definition file would require a selection of the runtime environment for the application and then the selection of the application.

14 Claims, 17 Drawing Sheets

```
72 ⎰ <ARML>
   ⎨    <HEAD>_</HEAD>
   ⎪    <SYS>
   ⎪         <QUERY>
   ⎪              <PLATFORMS>
   ⎪                   <PLATFORM>WinCE</PLATFORM>
   ⎪              </PLATFORMS>
   ⎪         </REG>
   ⎪    </SYS>
   ⎩ </ARML>

74 ⎰ <ARML>
   ⎨    <HEAD>_</HEAD>
   ⎪    <SYS>
   ⎪         <QUERYRESP>
   ⎪              <APP>Order Entry</APP>
   ⎪              <APP>Helpdesk</APP>
   ⎪              <APP>Engineer Dispatch</APP>
   ⎪         </QUERYRESP>
   ⎪    </SYS>
   ⎩ </ARML>

76 ⎰ <ARML>
   ⎨    <HEAD>_</HEAD>
   ⎪    <SYS>
   ⎪         <REG TYPE="ADD">
   ⎪              <CLIENTID>SUNTRESS</CLIENTID>
   ⎪              <MOBILEID>867452</MOBILEID>
   ⎪              <NEWMOBILEID>268625</NEWMOBILEID>
   ⎪              <PLATFORMS>
   ⎪                   <PLATFORM>WinCE</PLATFORM>
   ⎪              </PLATFORMS>
   ⎪         </REG>
   ⎪    </SYS>
   ⎩ </ARML>

78 ⎰ <ARML>
   ⎨    <HEAD>_</HEAD>
   ⎪    <SYS>
   ⎪         <REGCONFIRM TYPE="ADD">
   ⎪              <MOBILEID>268625</MOBILEID>
   ⎪              <VALUE>CONFIRM</VALUE>
   ⎪              <INTERFACE>
   ⎪                   <BUTTONS NUM="1">
   ⎪                        <BTN NAME="OK" CAPTION="Send" INDEX="0">
   ⎪                        </BTN>
   ⎪                   </BUTTONS>
   ⎪                   <EDITBOXES NUM="3">
   ⎪                        <E3 NAME="To" INDEX="1"></E3>
   ⎪                        <E3 NAME="Subject" INDEX="2"></E3>
   ⎪                        <E3 NAME="Body" INDEX="3"></E3>
   ⎪                   </EDITBOXES>
   ⎪              </INTERFACE>
   ⎪         </REGCONFIRM>
   ⎪    </SYS>
   ⎩ </ARML>
```

FIG. 11

```
<TDEF NAME="SENTITEMS" UPDATETYPE=NEW PK=LNGMESSAGEID DELINDEX=2>
    <FIELDS>
        <FLD TYPE="INT" SIZE="0" INDEXED="NO" ALLOWNULL="NO">LNGMESSAGEID</FLD>
        <FLD TYPE="STRING" SIZE="200" INDEXED="YES" ALLOWNULL="YES">VARFROM</FLD>
        <FLD TYPE="MEMO" SIZE="0" INDEXED="NO" ALLOWNULL="YES">MEMBODY</FLD>
        <FLD TYPE="STRING" SIZE="200" INDEXED="NO" ALLOWNULL="YES">VARSUBJECT</FLD>
    </FIELDS>
</TDEF>
<TDEF NAME="RECIPIENTS" UPDATTYPE=NEW PK=LNGRECIPIENTID DELINDEX=1>
    <FIELDS>
        <FLD TYPE="INT" SIZE="AUTOINC" INDEXED="NO" ALLOWNULL="NO">LNGRECIPIENTID</FLD>
        <FLD TYPE="INT" SIZE="0" INDEXED="YES" REFERENCFIELD="SENTITEMS(MESSAGEID)"
             ALLOWNULL="NO">LNGMESSAGEID</FLD>
        <FLD TYPE="STRING" SIZE="200" INDEXED="NO" ALLOWNULL="YES">VARADDRESS</FLD>
    </FIELDS>
</TDEF>
```

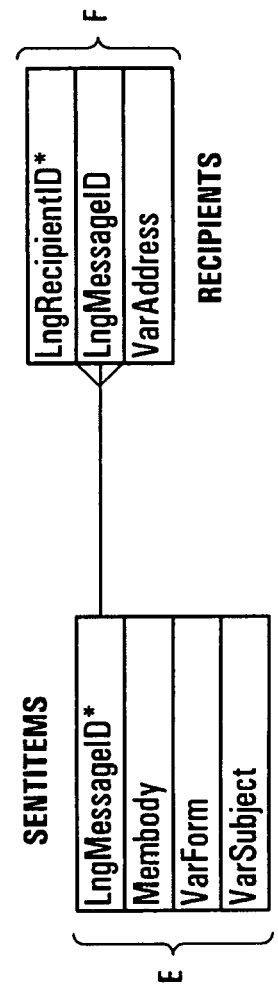

```
<AXDATAPACKET BODY="ME" SENDTOMOBILE="NO" SENDTOAPP="YES">
  <TABLEUPDATES>

<TUPDATE TABLE="SENTITEMS" UPDATETYPE="ADD" WHERETYPE="PROP"
       SECTION="MAIL" MULTIROW="NO"">
    <FIELDS>
      <PKGFLD NAME="LNGMESSAGEID" PARAMTYPE="PROP">MSGID</PKGFLD>
      <PKGFLD NAME="VARFROM" PARAMTYPE="PROP">FROM</PKGFLD>
      <PKGFLD NAME="VARSUBJECT" PARAMTYPE="PROP">SUBJECT</PKGFLD>
      <PKGFLD NAME="MEMBODY" PARAMTYPE="VALUE">DATA</PKGFLD>
    </FIELDS>
  </TUPDATE>

<TUPDATE TABLE="RECIPIENTS" UPDATETYPE="ADD" WHERETYPE="PROP"
       SECTION="RECIPS" MULTIROW="YES" MULTIROWIDENT="RCP">
    <FIELDS>
      <PKGFLD NAME="LNGMESSAGEID" PARAMTYPE="PROP">MSGID</PKGFLD>
      <PKGFLD NAME="VARFULLNAME" PARAMTYPE="PROP">TO</PKGFLD>
      <PKGFLD NAME="VARADDRESS" PARAMTYPE="PROP">ADDRESS</PKGFLD>
    </FIELDS>
  </TUPDATE>

</TABLEUPDATES>
</AXDATAPACKET>
```

TRANSPARENT VIRTUAL MACHINE FOR MOBILE APPLICATIONS

FIELD OF THE INVENTION

The present invention relates to software, devices and methods allowing varied mobile devices to interact with server-side software applications and, more particularly, to a user interface that allows increased user efficiency in the execution of a virtual machine-based application.

BACKGROUND

Wireless connectivity is a feature of the modern telecommunications environment. An increasing range of people are using a wide variety of wireless data networks to access corporate data applications.

However, there are numerous competing mobile devices that can be used to achieve this. Each mobile device has its own operating system and its own display characteristics. Operating systems are not mutually compatible, nor are the display characteristics—some are color, some are black and white, some are text-only, some are pictorial.

To allow for applications to be executed on a variety of different mobile devices, often a virtual machine is employed. The virtual machine may be mobile-device-specific so that applications designed to run on the virtual machine need not be. However, in some cases, to execute an application on a virtual machine on a mobile device, a user may be required to open an interface associated with the virtual machine and then select an application to be executed by the virtual machine.

An increasing number of mobile device users are people without a technical background or high level of educational achievement. Such people are often intimidated by the need to first open the interface associated with the virtual machine and then select an application to be executed by the virtual machine.

Therefore, a mechanism is desired by which an application may be enabled for multiple mobile devices yet still appear, in a user interface for a given mobile device, among those applications specific to the given mobile device. That is, it is desirable that the execution of the application should be accomplished without the need for separately opening an interface to the virtual machine that runs the application.

BRIEF DESCRIPTION OF THE DRAWINGS

In figures that illustrate, by way of example, embodiments of the present application:

FIG. 11 illustrates the format of messages exchanged in the message flow of FIG. 7;

FIG. 15A illustrates a sample portion of an application definition file defining a local storage at a mobile device;

FIG. 15B schematically illustrates local storage in accordance with FIG. 15A;

FIG. 15C illustrates how locally stored data is updated by a sample message in accordance with the sample portion of an application file definition of FIG. 15A;

DETAILED DESCRIPTION

In accordance with the present application, data from a server-side application executing at a computing device is presented by a client-side application executing at a remote wireless (mobile) device. The mobile device is provided with an application definition file that contains: definitions for a user interface format for the client-side application at the mobile device; a format of network messages for exchange of data generated by the client-side application; and a format for storing data related to the client-side application at the mobile device. Using the definitions, the mobile device may receive data from the server-side application and present a client-side interface for the server-side application. Preferably, the application definition file is an XML file. Similarly, server-side application-specific network messages provided to the device are also formed using XML. In the preferred embodiment, the data from the server-side application is presented at the mobile device by a virtual machine, where the server-side application is based on the application definition file.

The inclusion of metadata within the application definition file allows the virtual machine to create an application descriptor file that may be registered with the mobile device operating system so that an icon associated with the application description file may be displayed in the main ribbon. Execution of the client-side application defined by the application definition file may then be initiated when the user selects the icon that is associated with the application definition file. Thus, an improvement is realized over the situation wherein execution of the application defined by the application definition file requires a selection of the runtime environment for the application and then the selection of the application.

In accordance with an aspect of the present application, a method of presenting a user interface screen using a virtual machine. The method includes receiving an application definition file, registering the application definition file with an operating system that is executing the virtual machine to cause the operating system to present a reference to the application definition file, receiving an indication of selection of the reference to the application definition file, responsive to the receiving the indication, interpreting the application definition file to create an application and executing the application on the virtual machine. Further aspects of the present application include a computing device adapted to carry out this method.

Other aspects and features of the present application will become apparent to those of ordinary skill in the art, upon review of the following description of specific embodiments of the application in conjunction with the accompanying figures.

Figure 1:
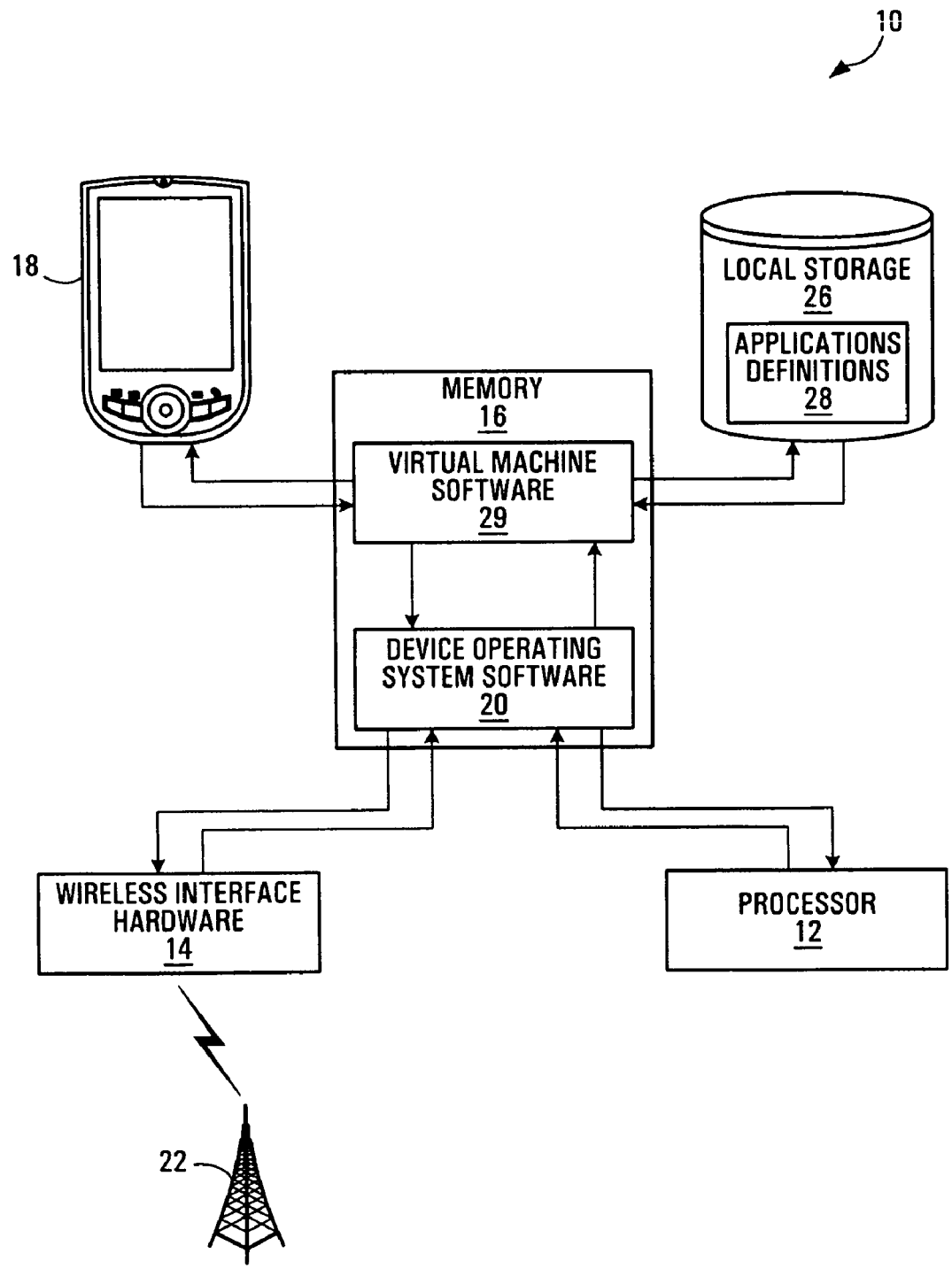
FIG. 1 schematically illustrates a mobile device, exemplary of an embodiment of the present application, including virtual machine software, further exemplary of an embodiment of the present application.

FIG. 1 illustrates elements of a mobile device 10, exemplary of an embodiment of the present application, in communication with a wireless network 22. The mobile device 10 may be any conventional mobile device, modified to function in manners exemplary of the present application. As such, elements of the mobile device 10 include a processor 12, a network interface 14, a storage memory 16 and a user interface 18 typically including a keypad and/or touch-screen. The network interface 14 enables the device 10 to transmit and receive data over the wireless network 22. The mobile device 10 may be, for example, be a WinCE-based device, a PalmOS device, a WAP enabled mobile telephone, or the like. The storage memory 16 of the device 10 stores operating system software 20 providing a mobile operating system such as the PalmOS or WinCE. The operating system software 20 typically includes graphical user interface software and network interface software having suitable application programming interfaces (APIs) for use by other applications executing at the device 10.

The storage memory 16 at the device 10 further stores virtual machine software 29, exemplary of an embodiment of the present application. The virtual machine software 29, when executed by the mobile device 10, enables the device 10 to present an interface, for a server-side application provided by a middleware server, as described below. Specifically, a virtual machine 24 (see FIG. 2), which exists through an execution of the virtual machine software 29 on the processor 12, interprets a text application definition file defining: a user interface 18 controlling application functionality and the display format (including display flow) at the device 10 for a particular server-side application; the format of data to be exchanged over the wireless network 22 for the particular server-side application; and the format of data to be stored locally at the device 10 for the particular server-side application. The virtual machine 24 uses the operating system software 20 and associated APIs to interact with the device 10, in accordance with the received application definition file. In this way, the device 10 may present interfaces for a variety of server-side applications, executed at a variety of servers. Moreover, multiple wireless devices may use a common server-side application, as each wireless device executes a similar virtual machine that interprets an application definition file to present a user interface and program flow specifically adapted for the device.

As such, and as will become apparent, the exemplary virtual machine software is specifically adapted to work with the particular mobile device 10. Thus, if the device 10 is a PalmOS or WinCE device, the virtual machine 24 that results from executing the exemplary virtual machine software 29 is, correspondingly, a PalmOS virtual machine or a WinCE virtual machine. As further illustrated in FIG. 1, the virtual machine 24 is capable of accessing the local storage 26 at the device 10.

Other applications, libraries and software may also be present within the memory 16 or the local storage 26 and are not specifically illustrated. For example, the device 10 may store and execute personal information management (PIM) software, including calendar and contact management applications. Similarly, the device 10 could store and execute software allowing the device 10 to perform a number of functions. Software could, for example, interact with the hardware at the device 10 to allow the device 10 to act as a multimedia player; allowing the device 10 to print; allowing the device 10 to interact with other incorporated hardware not specifically illustrated, including, but not limited to, a Bluetooth interface; a Global Positioning Satellite (GPS) Receiver; and the like. The memory 16 may also store software components in the form of object classes that may be used to extend the functionality of the virtual machine 24. As will become apparent, these external software components in the form of object classes allow the virtual machine 24 to become extensible. The object classes may, for example, allow the virtual machine 24 to access additional hardware or software local to the device 10.

As detailed below, an exemplary application definition file may be formed using a markup language, such as the known eXtensible Markup Language (XML) or a variant thereof. In accordance with an embodiment of the present application, defined XML entities are understood by the virtual machine 24. Defined XML entities are detailed in Appendix "A" (FIGS. 16A-16JJ) of US Patent Application Publication 2003/0060896 A9. The defined XML entities are interpreted by the virtual machine 24 and may be used as building blocks to present an interface, at the mobile device 10, to server-side applications, as detailed herein.

Figure 2:
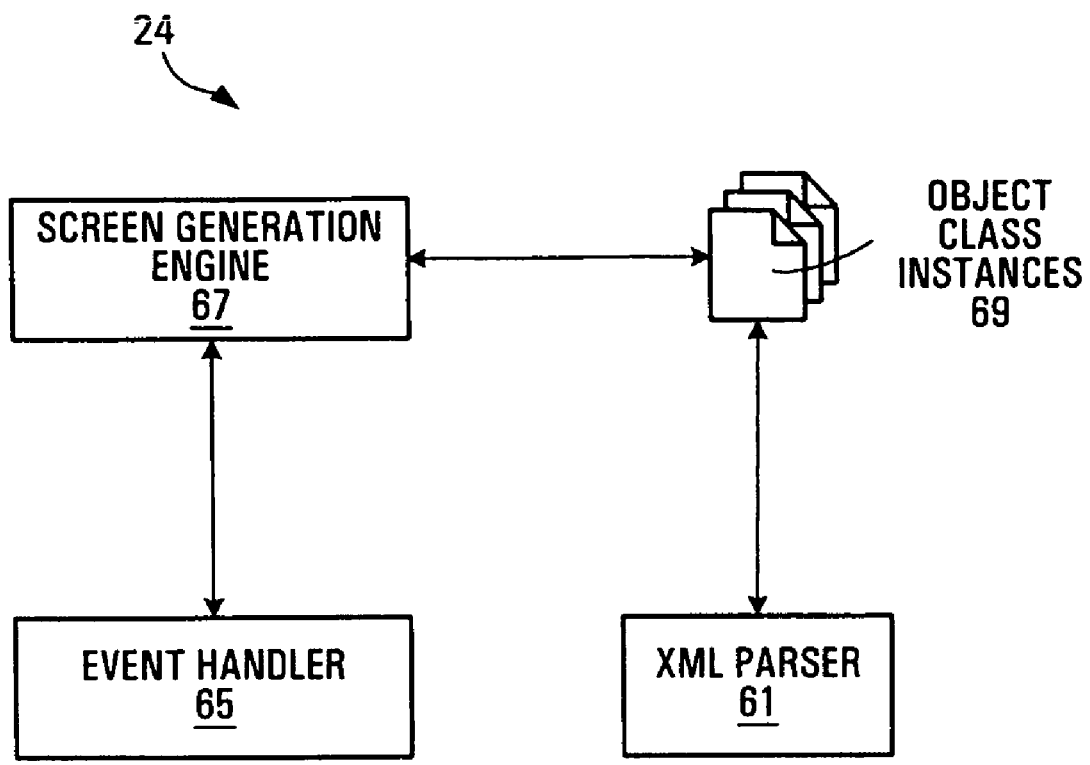
FIG. 2 further illustrates the organization of an exemplary virtual machine at the mobile device of FIG. 1.

Specifically, as illustrated in FIG. 2, the virtual machine software 29 includes: conventional XML parser software; event handler software; screen generation engine software; and object classes. The virtual machine software 29, when executed leads to the virtual machine 24, which includes: an XML parser 61; an event handler 65; a screen generation engine 67; and instances of the object classes 69. The object classes correspond to XML entities supported by the virtual machine software 29 and possibly other XML entities contained within an application definition file. Supported XML entities are detailed in Appendix "A" of previously-referenced US Patent Application Publication 2003/0060896 A9. A person of ordinary skill will readily appreciate that those XML entities identified in Appendix "A" are exemplary only and may be extended or shortened as desired.

The XML parser 61 may be formed in accordance with the Document Object Model, or DOM, available at www.w3.org/DOM/, the contents of which are hereby incorporated by reference. The XML parser 61 enables the virtual machine 24 to read an application description file. Using the XML parser 61, the virtual machine 24 may form a binary representation of the application definition file for storage at the mobile device 10, thereby eliminating the need to parse text each time an application is used. The XML parser 61 may convert each XML tag contained in the application definition file, and its associated data, to tokens, for later processing. As will become apparent, this may avoid the need to repeatedly parse the text of an application description file.

The screen generation engine 67 orchestrates the display of initial and subsequent screens at the mobile device 10 in accordance with an application description file 28, as detailed below.

The event handler 65 allows the virtual machine 24 to react to certain external events. Example events include user interaction with presented screens or display elements, incoming messages received from a wireless network, or the like.

The object classes define objects that allow the mobile device 10 to process each of the supported XML entities. Each of the object classes includes attributes, which are used to store parameters defined by the XML file and functions allowing the XML entity to be processed at the mobile device, as detailed in Appendix "A" of previously-referenced US Patent Application Publication 2003/0060896 A9, for each supported XML entity. So, as should be apparent, supported XML entities are extensible. The virtual machine software 29 may be expanded to support XML entities not detailed in Appendix "A". Corresponding object classes could be added to the virtual machine software 29.

As detailed below, upon invocation of a particular application at the mobile device 10, the virtual machine 24 presents an initial screen on the user interface 18 based on the contents of the application definition file 28. Screen elements are created by the screen generation engine 67 by creating instances 69 of corresponding object classes for defined elements. The object class instances 69 are created using attributes contained in the application definition file 28. Thereafter, the event handler 65 of the virtual machine 24 reacts to events for the application. Again, the event handler 65 consults the contents of the application definition file 28 for the application in order to properly react to events. Events may be reacted to by creating instances of associated "action" objects from the object classes.

Similarly, the object classes of the virtual machine software 29 further include object classes corresponding to data tables and network transactions defined in the Table Definition and Package Definition sections of Appendix "A" of previously-referenced US Patent Application Publication 2003/0060896 A9. At run time, instances 69 of object classes corresponding to these classes are created and populated with parameters contained within the application definition file 28, as required.

Using this general description, persons of ordinary skill in the art will be able to form the virtual machine software 29 for any particular device. Typically, the virtual machine software 29 may be formed using conventional object oriented programming techniques and existing device libraries and APIs, so as to function as detailed herein. As will be appreciated, the particular format of the screen generation engine 67 and the object class instances 69 will vary depending on the type of virtual machine software, the device operating system and the APIs available at the device. Once formed, a machine executable version of the virtual machine software 29 may be loaded and stored at the mobile device 10, using conventional techniques. The machine executable version of the virtual machine software can be embedded in ROM, loaded into RAM over a network or loaded into RAM from a computer readable medium. Although, in the preferred embodiment the virtual machine software is formed using object oriented structures, persons of ordinary skill will readily appreciate that other approaches could be used to form suitable virtual machine software. For example, the object classes forming part of the virtual machine software 29 could be replaced by equivalent functions, data structures or subroutines formed using a conventional (i.e., non-object oriented) programming environment. Operation of the virtual machine 24, while consulting an application definition file containing various XML definitions, is further detailed below.

Figure 3:
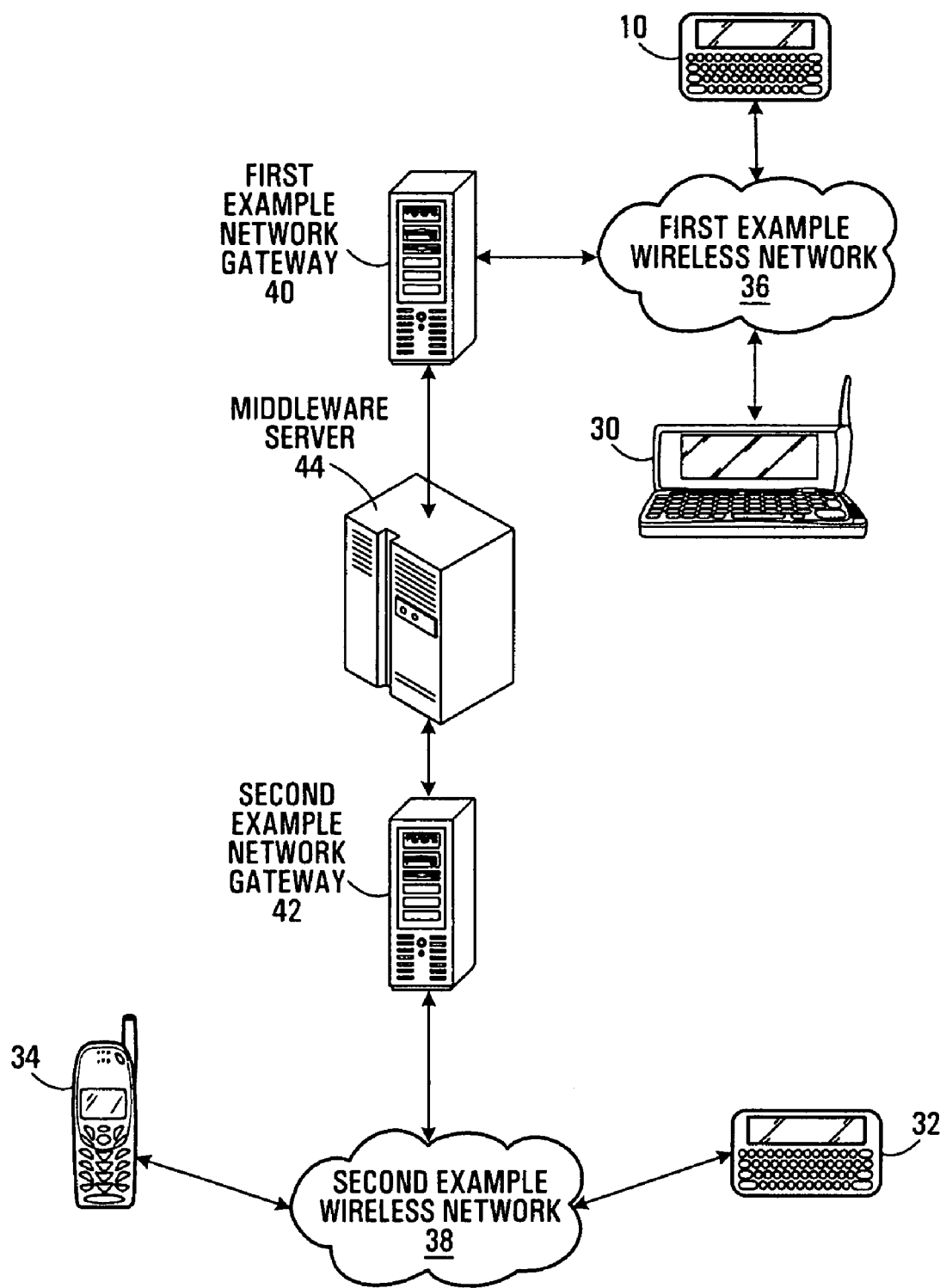
FIG. 3 illustrates an operating environment for the device of FIG. 1 including a middleware server.

FIG. 3 illustrates the operating environment for the first example mobile device 10. Further example mobile devices, including a second example mobile device 30, a third example mobile device 32 and a fourth example mobile device 34 are also illustrated in FIG. 3. These further example mobile devices 30, 32 and 34 are similar to the first example mobile device 10 and also store and execute virtual machine software exemplary of an embodiment of the present application.

Virtual machines, like the virtual machine 24 executed at the first example mobile device 10, execute on each of the further example mobile devices 30, 32, 34, and communicate with a middleware server 44 by way of a first example wireless network 36, a second example wireless network 38, a first example network gateway 40 and a second example network gateway 42. The example gateways 40, 42 are generally available as a service for those people wishing to have data access to wireless networks. An example network gateway is available from Broadbeam Corporation, of Cranbury, N.J., in association with the trademark SystemsGo!™. The wireless networks 36, 38 are further connected to one or more computer data networks, such as the Internet and/or private data networks by way of the example gateways 40, 42. As will be appreciated, the application may work with many types of wireless networks. The middleware server 44 is, in turn, in communication with a data network that is in communication with the example wireless networks 36, 38. The communication protocol used for such communication may be TCP/IP over an HTTP transport. As could be appreciated, other network protocols such as X.25 or SNA could equally be used for this purpose.

The mobile devices 10, 30, 32, 34 communicate with the middleware server 44 in two ways. First, the virtual machine at each device may query the middleware server 44 for a list of applications of which a user of an associated mobile device 10, 30, 32, 34 can make use. If a user decides to use a particular application, the corresponding mobile device 10, 30, 32, 34 can download a text description, in the form of an application definition file, for the particular application from the middleware server 44 over its wireless interface. As noted, the text description is preferably formatted using XML. Second, the virtual machine at each device may send, receive, present and locally store data related to the execution of applications, or its own internal operations. The format of exchanged data for each application is defined by an associated application description file. Again, the exchanged data is preferably formatted using XML in accordance with the application description file.

The middleware server 44, in turn, stores text application description files for those applications that have been enabled to work with the various mobile devices 10, 30, 32, 34 in a pre-defined format understood by the corresponding virtual machines. Software providing the functions of the middleware server 44 in the exemplary embodiment is written in Delphi and uses an SQL Server database.

As noted, text files defining application definitions and data may be formatted in XML. For example, XML version 1.0, detailed in the XML version 1.0 specification second edition, dated Oct. 6, 2000 and available at the internet address www.w3.org/TR/2000/REC-xml-20001006, the contents of which are hereby incorporated herein by reference, may be used. However, as will be appreciated by those of ordinary skill in the art, the functionality of storing XML description files is not dependent on the use of any given programming language or database system.

Each application definition file is formatted according to defined rules and uses pre-determined XML markup tags, known to both the virtual machine executed at the mobile device and the complementary server software executed at the middleware server 44. Tags define XML entities, which are used as building blocks to present an interface to an application at a mobile device. Knowledge of these rules, and an understanding of how each tag and section of text should be interpreted, allows the virtual machine executed at the mobile device to process an XML application definition file and thereafter provide an interface to an application executed at an application server, as described below. The virtual machine effectively acts as an interpreter for a given application definition file.

Figure 4:
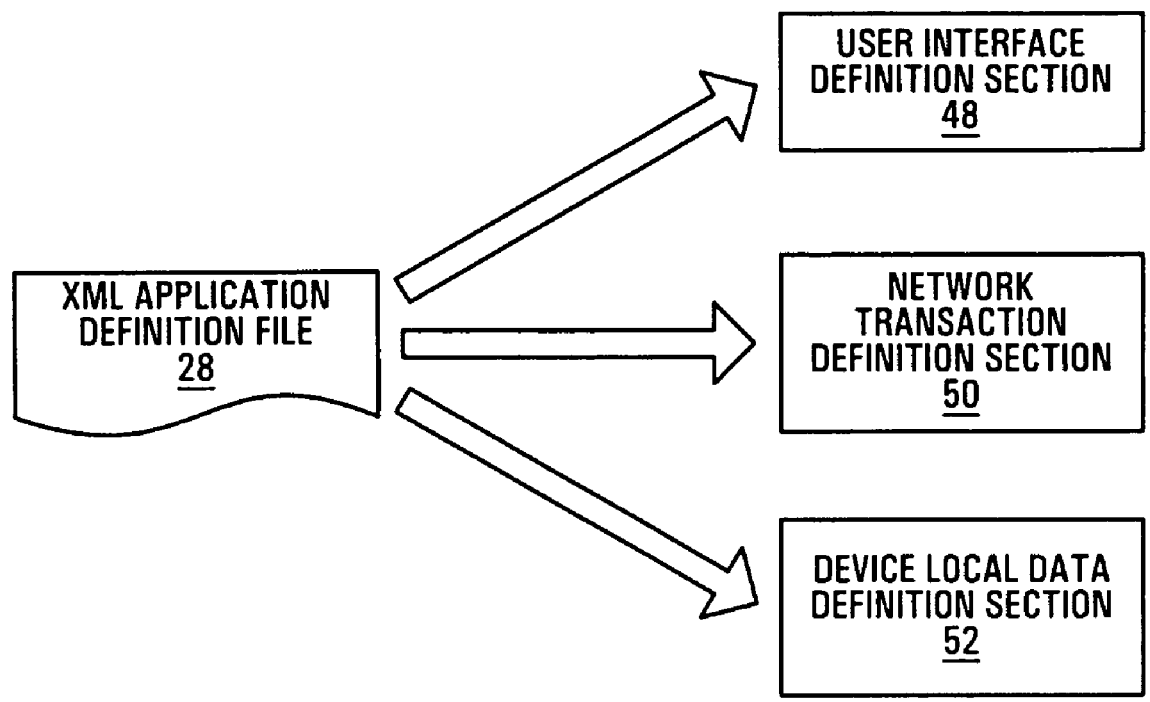
FIG. 4 illustrates the structure of an example application definition file stored at the middleware server of FIG. 3 used by the device of FIG. 1.

FIG. 4 illustrates an example format for an XML application definition file 28. As illustrated, the example application definition file 28 for a given mobile device and server-side application includes three components: a user interface definition section 48, specific to the user interface for the mobile device 10, that defines the format of screen or screens for the application and how the user interacts with the screens; a network transactions definition section 50 that defines the format of data to be exchanged with the application; and a local data definition section 52 that defines the format of data to be stored locally on the mobile device by the application.

Defined XML markup tags correspond to XML entities supported at a mobile device and are used to create an application definition file 28. The defined tags may broadly be classified into three categories, corresponding to the three sections 48, 50 and 52 of an application definition file 28.

Example XML tags and their corresponding significance are detailed in Appendix "A" of previously-referenced US Patent Application Publication 2003/0060896 A9. As noted above, the virtual machine software 29 at the mobile device 10 includes object classes corresponding to each of the XML tags. At run time, instances of the objects are created as required.

Broadly, the following example XML tags may be used to define the user interface:

<SCREEN>—this tag defines a screen such that a SCREEN tag pair contains the definitions of the screen elements (buttons, radio buttons and the like) and the events associated with the screen and the screen control elements;

<BTN>—this tag defines a button and attributes associated with the button;

<LIST>—this tag defines a list box;

<CHOICEBOX>—this tag defines a choice item, which allows selection of a value from predefined list;

<MENU>—the application developer will use this tag to define a menu for a given screen;

<EDITBOX>—this tag defines an edit box;

<TEXT ITEM>—this tan describes a text label that is to be displayed;

<CHECKBOX>—this tag describes a checkbox;

<HELP>—this tag defines a help topic that is used by another element on the screen;

<IMAGE>—this tag describes an image that appears on those displays that support images;

<ICON>—this tag describes an icon;

<EVENT>—this tag defines an event to be processed by the virtual machine 24 (events can be defined against the application as a whole, individual screens or individual items on a given screen; sample events include: receipt of data over the wireless interface; and an edit of text in an edit box); and <ACTION>—this tag defines a particular action that might be associated with an event handler (sample actions include: navigating to a new window; and displaying a message box.).

The second category of example XML tags may be used in the network transaction section 50 of the application definition file 28. These may include the following example XML tags:

<TABLEUPDATE>—using this tag, the application developer can define an update that is performed to a table in the device-based local storage 26 (attributes of this tag allow the update to be performed against multiple rows in a given table at once); and <PACKAGEFIELD>—this tag defines a field in an XML package that passes over the wireless interface.

The third category of XML tags are those used to define a logical database that may be stored in local storage 26 at the mobile device 10. The tags available that may be used in this section are:

<TABLE>—this tag, along with its attributes, defines a table (contained within a pair of <TABLE>tags are definitions of the fields contained in that table; the attributes of a table control such standard relational database functions as the primary key for the table); and <FIELD>—this tag defines a field and its attributes (attributes of a field are those found in a standard relational database system, such as the data type, whether the field relates to a field in a different table, the need to index the field and so on).

The virtual machine 24 may, from time to time, need to perform certain administrative functions on behalf of a user. In order to do this, one of the object classes is associated with a repertoire of tags to communicate needs to the middleware server 44. Such tags differ from the previous three groupings in that they do not form part of an application definition file, but are solely used for administrative communications between the virtual machine 24 and the middleware server 44. XML packages using these tags are composed and sent due to user interactions with configuration screens of the virtual machine 24. The tags used for this include:

<REG>—this tag allows the application to register and deregister a user for use with the middleware server 44;

<FINDAPPS>—by using this tag, users can interrogate the middleware server 44 for a list of available applications;

<APPREG>—using this tag, a mobile device can register (or deregister) for an application and have the application definition file downloaded automatically (or remove the application definition file from the device-based local storage 26); and <SETACTIVE>—using this tag, the user is allowed to identify the device that the user is currently using as the active device (if the user's preferred device is malfunctioning, or out of power or coverage, the user may need a mechanism to tell the middleware server 44 to attempt delivery to a different device).

Figure 5:
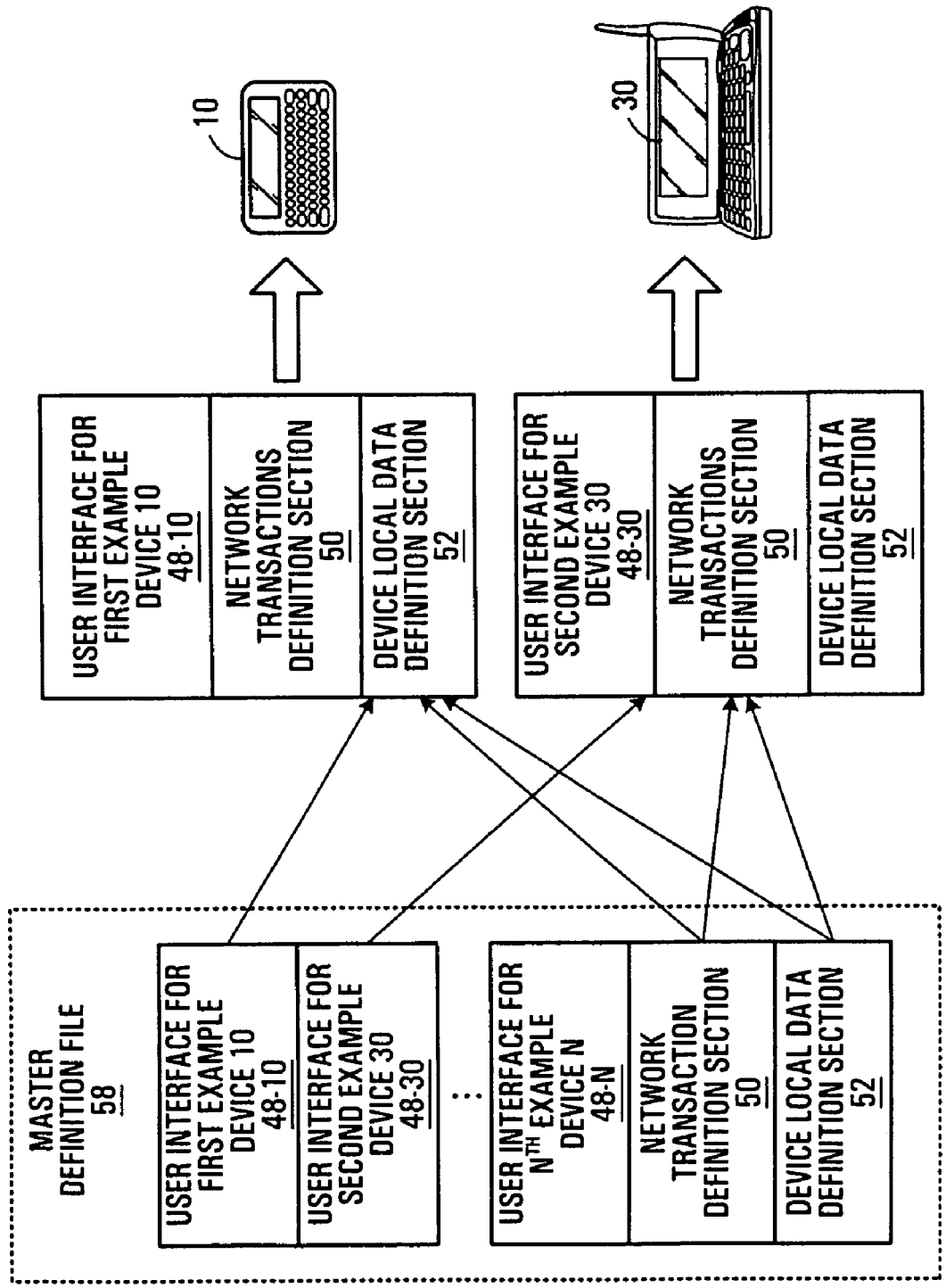
FIG. 5 schematically illustrates the formation of application definition files at the middleware server of FIG. 3.

FIG. 5 illustrates the organization of application definition files at the middleware server 44 and how the middleware server 44 may generate an application definition file 28 (FIG. 4) for a given one of the example mobile devices 10, 30, 32, 34. In the illustration of FIG. 5, only the first example mobile device 10 and the second example mobile device 30 are considered. Typically, since network transactions and local data are the same across devices, the only portion of the application definition file that varies for different devices is the user interface definition section 48.

As such, the middleware server 44 stores a master definition file 58 for a given server-side application. This master definition file 58 contains: an example user interface definition section 48-10 for the first example mobile device 10 of FIG. 1; an example user interface definition section 48-30 for the mobile device 30 of FIG. 3; a user interface definition section 48-N for an Nth mobile device; a description of the network transactions that are possible in the network transactions definition section 50; and a definition of the data to be stored locally on the mobile device in the local data definition sections 52. Preferably, the network transactions definition section 50 and the local data definition sections 52 will be the same for all example mobile devices 10, 30, ..., N.

For the first example mobile device 10, the middleware server 44 composes the application definition file 28 by determining the device type and adding the user interface definition section 48-10 for the first example mobile device 10 to the definition sections 50, 52 for the network transactions and the device local data. For the second example mobile device 30, the middleware server 44 composes the application definition file by adding the user interface definition section 48-30 for the second example mobile device 30 to the definition sections 50, 52 for the network transactions and the device local data.

The master definition file 58 for a given application is likely to be created away from the middleware server 44 and loaded onto the middleware server 44 by administrative staff charged with the operation of the middleware server 44. Master definition files could be created either by use of a simple text editor or by a graphical file generation tool. Such a tool might generate part or all of the file, using knowledge of the XML formatting rules, based on the user's interaction with screen painters, graphical data definition tools and the like.

Figure 6:
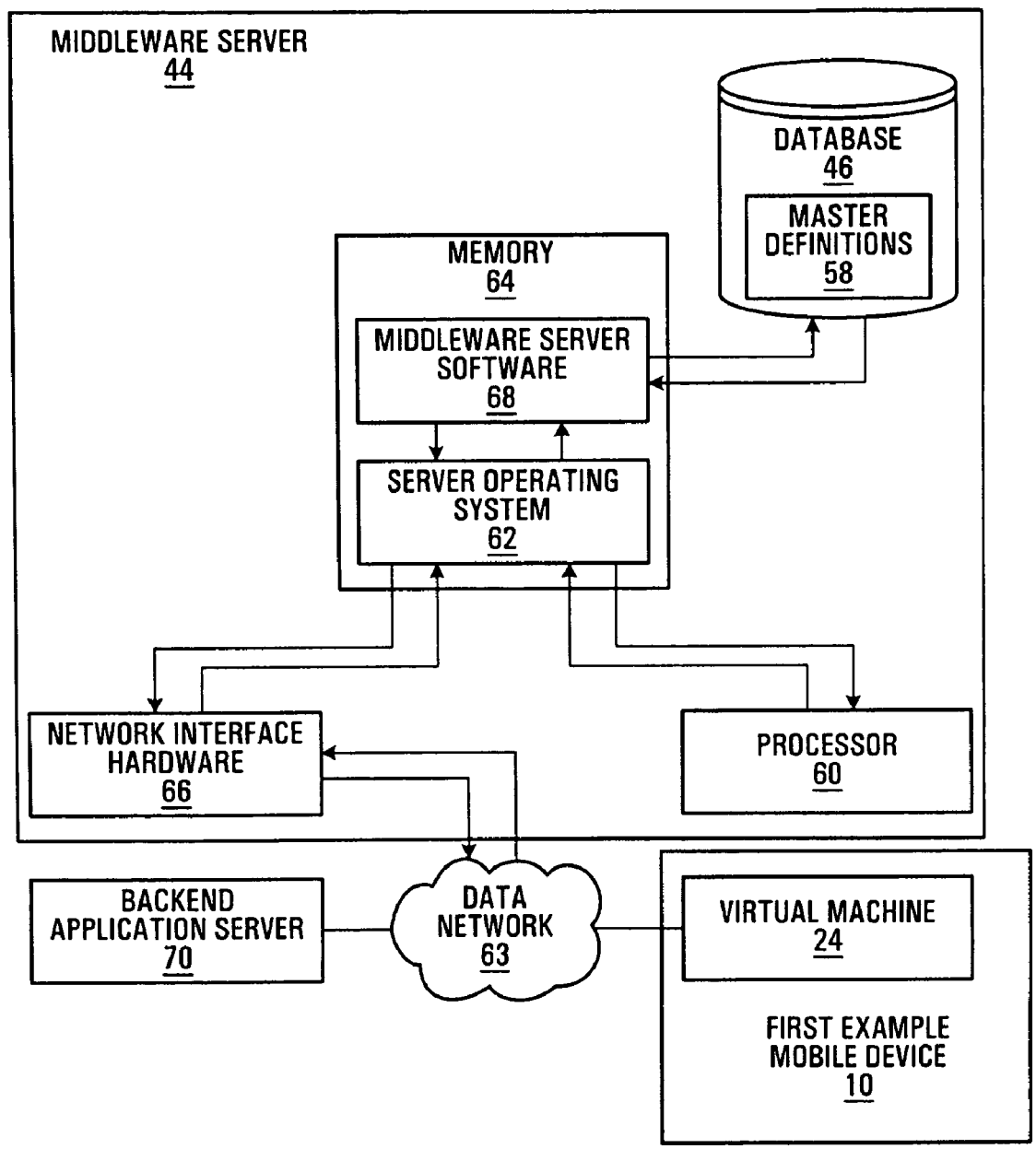
FIG. 6 schematically illustrates the middleware server of FIG. 3, exemplary of an embodiment of the present application, including a database, further exemplary of an embodiment of the present application.

FIG. 6 illustrates the organization of middleware server 44 and associated master definition files. The middleware server 44 may be any conventional application server modified to function in manners exemplary of the present application. As such, the middleware server 44 includes a processor 60, a network interface 66, a storage memory 64 and a server database 46. The middleware server 44 may, for example, be a Windows NT server, a Sun Solaris server, or the like. Correspondingly, the storage memory 64 of the middleware server 44 stores a server operating system 62 such as Windows NT or Solaris.

The network interface hardware 66 enables the middleware server 44 to transmit and receive data over a data network 63. Transmissions are used to communicate with both the virtual machine 24 of the first example mobile device 10, via the wireless networks 36, 38 and the wireless gateways 40, 42, and a backend application server 70, which may be considered representative of one or more application servers. The backend application server 70 may be considered both the end recipient of data received by the middleware server 44 from the mobile devices and the generator of data that is to be sent by the middleware server 44 to the mobile devices.

The storage memory 64 at the middleware server 44 further stores middleware server software 68, exemplary of an embodiment of an aspect of the present application. The middleware server software 68, when executed by the processor 60 of the middleware server 44, enables the middleware server 44 to compose and understand XML packages that are sent by and received by the middleware server 44. These XML packages may be exchanged between the middleware server 44 and the first example mobile device 10 or between the middleware server 44 and the backend application server 70.

As mentioned above, communication between the backend application server 70 and the middleware server 44 may use HTTP running on top of a standard TCP/IP stack. An HTTP connection between a running application at the backend application server 70 and the middleware server 44 may be established in response to receipt of an XML package from a mobile device. The server-side application executed at the backend application server 70 provides output to the middleware server 44 over this connection. The server-side application output may be formatted, by the server-side application, into appropriate XML packages understood by the virtual machine 24 at the first example mobile device 10.

That is, a given server-side application (or an interface portion of the server-side application) formats server-side application output into an XML package in a manner consistent with a format defined in the application definition file for the given server-side application. Alternatively, an interface component, separate from the server-side application, could easily be formed with an understanding of the format for output for the given server-side application. That is, with a knowledge of the format of data provided by and expected by the given server-side application at the backend application server 70, an interface component could be produced using techniques readily understood by those of ordinary skill. The interface component could translate the output of the given server-side application to an XML package, as expected by the middleware server 44. Similarly, the interface portion may translate an XML package received, via the middleware server 44, from the mobile device 10 into a format understood by the given server-side application.

The particular identity of the mobile device on which the interface to the server-side application is to be presented may be specified by a suitable identifier, contained in a header prefixed to the server-side application output XML package. This header may be used by the middleware server 44 to determine the appropriate mobile device to which to forward the XML package. Alternatively, the identity of the connection between the backend application server 70 and the middleware server 44 could be used to determine, at the middleware server 44, the appropriate mobile device to which to forward the XML package.

Figure 7:
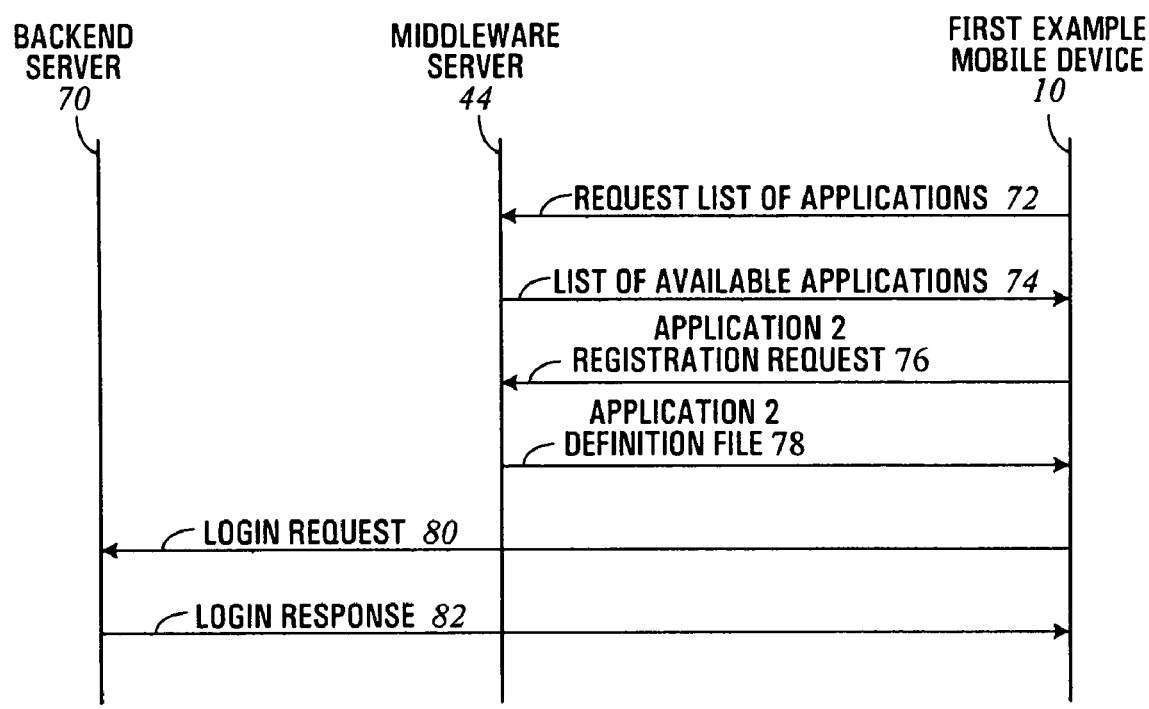
FIG. 7 is a flow diagram illustrating the exchange of sample messages passed between the mobile device, the middleware server and the backend application server of FIG. 3.

FIG. 7 illustrates a flow diagram detailing data flow (application data or application definition files 28) between the mobile device 10 and the middleware server 44, in manners exemplary of an embodiment of the present application.

For data requested from the middleware server 44, the device 10, under software control by the virtual machine software, transmits requests to the middleware server 44 (see also FIG. 3), which requests pass over the first wireless network 36 to the first network gateway 40. The first network gateway 40 passes the request to the middleware server 44. The processor 60 of the middleware server 44 responds by executing a database query on the server database 46. The response to the query is an indication of the applications that are available to the user and the mobile device 10. Data representative of the indication is passed, by the middleware server 44, to the first network gateway 40. The first network gateway 40 forwards the data representative of the indication to the mobile device 10 over the first wireless network 36.

FIG. 7, when considered with FIG. 3, illustrates a sequence of communications, between the virtual machine 24 at the device 10 and the middleware server 44, that may occur when the user of the mobile device 10 wishes interact with a server-side application. Initially, the virtual machine 24 interrogates the middleware server 44 to determine the applications that are available for the first example mobile device 10. This interrogation may be initiated by the user instructing the virtual machine 24 at the first example device 10 to interrogate the middleware server 44. Responsive to these instructions, the virtual machine 24 composes an XML package requesting the list of applications. The wireless interface hardware 14 (see FIG. 1) of the mobile device 10 transmits the XML package to the middleware server 44 (data flow 72). The XML message may be composed to contain a <FINDAPPS> tag, signifying, to the middleware server 44, a desire for a list of available applications. In response, the middleware server 44 makes a query to the server database 46. The server database 46, responsive to this query, returns a list of applications that are available to the user and to the first example mobile device 10. The list is typically based, at least in part, on the type of mobile device making the request, the identity of the user of the mobile device and the applications known to the middleware server 44. The middleware server 44 converts the list into an XML list package and transmits the XML list package, including a list of available applications, to the mobile device 10 (data flow 74). Again, a suitable XML tag identifies the XML list package as containing a list of available applications.

In response to being presented with the list of available applications, a user at the first example device 10 may choose to register for an available server-side application in the list. When the user chooses to register for an application, the virtual machine 24 at the device 10 composes a registration request XML package containing a registration request for the selected application. The wireless interface hardware 14 transmits the registration request XML package to the middleware server 44 (data flow 76). The registration request XML package may contain a <REG> tag. The name of the application is specified in the registration request XML package. The middleware server 44, in response to receiving the registration request XML package, queries the server database 46 for a user interface definition associated with the specified application and the first example mobile device 10. Thereafter, the middleware server 44 creates the application definition file, as detailed with reference to FIG. 5. Then, the middleware server 44 composes an XML package including the composed application definition file and transmits the XML package to the mobile device 10 (data flow 78).

The user is then able to use the functionality defined by the application definition file to send and receive data.

After receiving the XML package including the application definition file, the XML parser 61 of the virtual machine 24 may parse the XML text of the application definition file to form a tokenized version of the application definition file. That is, each XML tag of the application definition file may be converted to a defined token for compact storage and to minimize repeated parsing of the XML text file. The tokenized version of the application definition file may then be stored for immediate or later use by the device 10.

Thereafter, upon invocation of an interface to the particular application for which the device 10 has registered, the screen generation engine 67 of the virtual machine 24 locates the definition of an initial screen for the particular application. The initial screen may be identified within the application definition file for the particular application as corresponding to a <SCREEN> tag with an associated attribute of First screen="yes".

Figure 8:
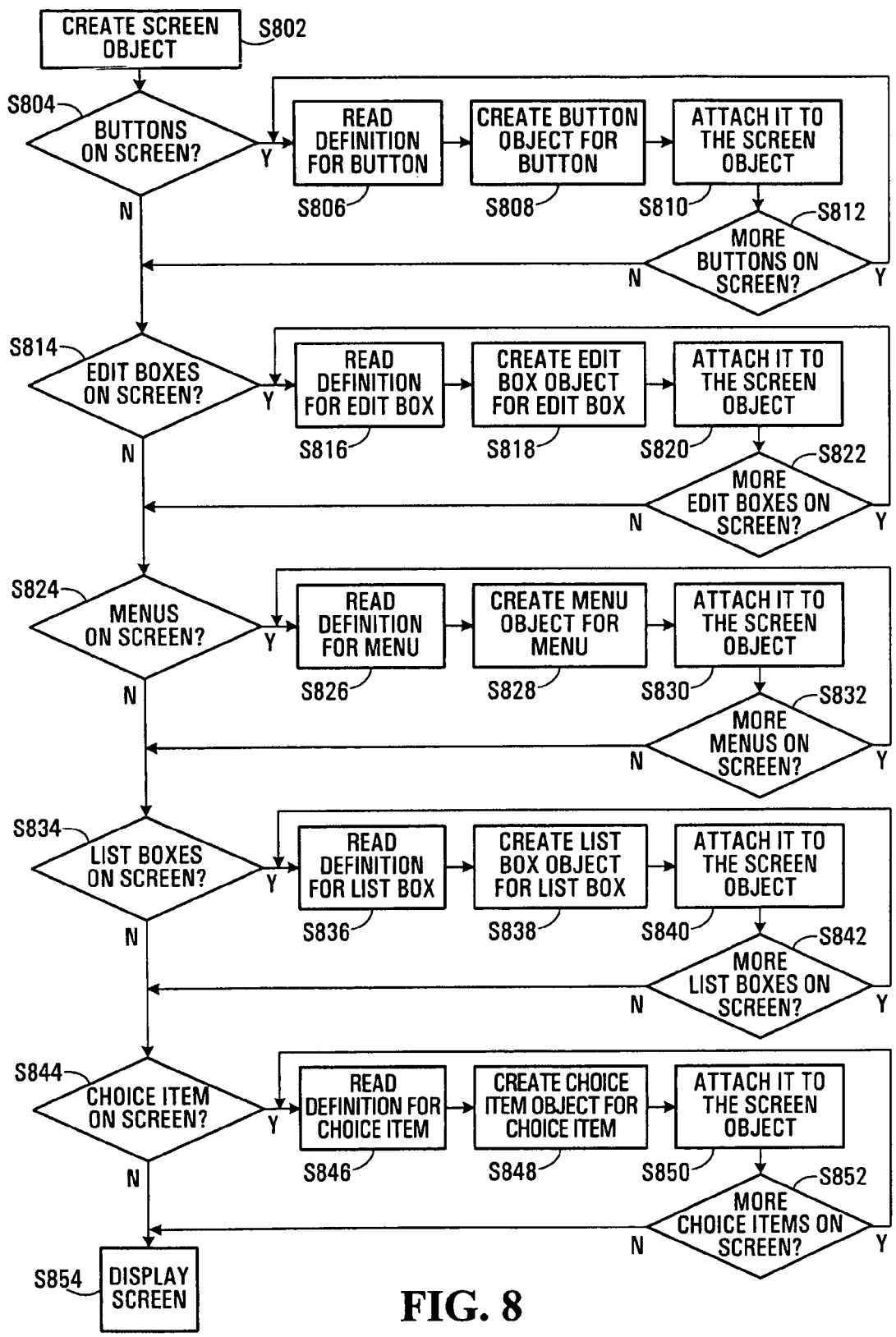
FIG. 8 illustrates steps performed at a mobile device under control of the virtual machine of FIG. 2.

Exemplary steps performed by the virtual machine 24 in processing the initial screen (and any screen) are illustrated in FIG. 8. As illustrated, the screen generation engine 67 generates an instance of an object class, defining a screen by parsing the section of the application definition file corresponding to the <SCREEN> tag in step S802. Supported screen elements may be buttons, edit boxes, menus, list boxes and choice items, as identified in sections 5.3, 5.4 and 5.5 of Appendix "A" of previously-referenced US Patent Application Publication 2003/0060896 A9. Other screen elements, such as images and checkboxes, as detailed in Appendix "A", may also be supported. However, for clarity of illustration, the processing of the other screen elements by the screen generation engine 67 is not detailed. Each supported tag under the SCREEN definition section, in turn, causes creation of instances 69 of object classes within the virtual machine 24. Typically, instances of objects corresponding to the tags, used for creation of a screen, result in presentation of data at the mobile device 10. As well, the creation of such instances may give rise to events (e.g., user interaction) and actions to be processed at the device 10.

Figure 9:
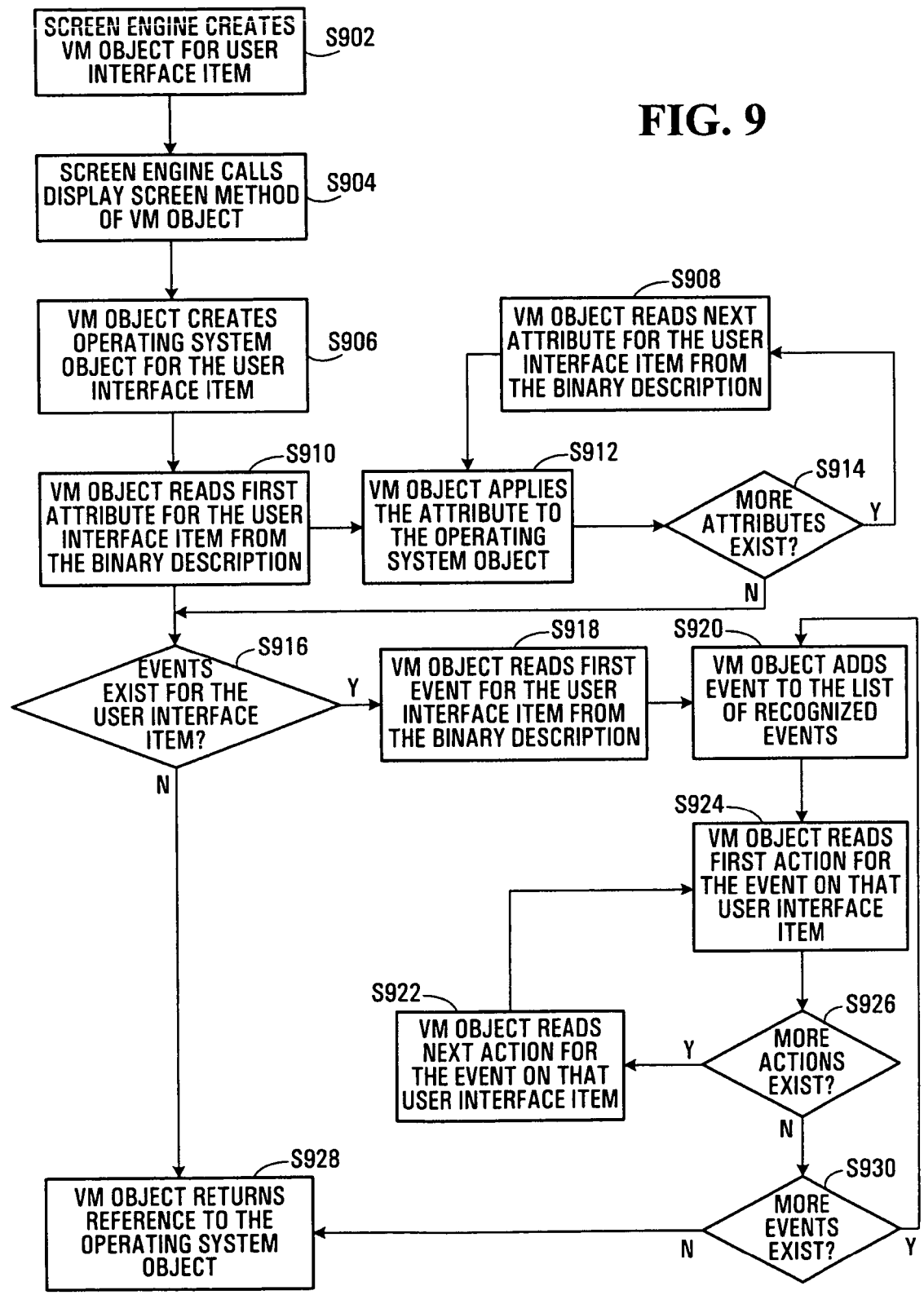
FIG. 9 illustrates steps performed at a mobile device under control of the virtual machine of FIG. 2.

Each element definition causes the virtual machine 24 to use the operating system of the mobile device 10 to create a corresponding display element of a graphical user interface, as more particularly illustrated in FIG. 9. Specifically, for each element, the associated XML definition is read in step S806, S816, S826, S836, and S846, and a corresponding instance of a screen object defined as part of the virtual machine software is created by the virtual machine 24 in steps S808, S818, S828, S838 and S848, in accordance with steps S902 and onward illustrated in FIG. 9. Each interface object instance is created in step S902. Each instance takes, as attributes, values defined by the XML text associated with the element. A method of the object is further called in step S904 and causes a corresponding device operating system object to be created. Those attributes defined in the XML text file, and stored within the virtual machine object instance, are applied to the corresponding instance of a display object created using the device operating system in steps S908S-S914. These steps are repeated for all attributes of the virtual machine object instance. For any element allowing user interaction, giving rise to an operating system event, the event handler 65 of the virtual machine 24 is registered to process operating system events, as detailed below.

Additionally, for each event (as identified by an <EVENT> tag) and action (as identified by an <ACTION> tag) associated with each XML element, the virtual machine 24 creates an instance of a corresponding event object and action object forming part of the virtual machine software. The virtual machine 24 further maintains a list identifying each instance of each event object and each action object, and an associated identifier of an event in steps S916 to S928.

Steps S902-S930 are repeated for each element of the screen in steps S808, S818, S828, S838 and S848 as illustrated in FIG. 8. All elements between the <SCREEN> definition tags are so processed. After the entire screen has been so created in memory, the screen is displayed in step S854, using conventional techniques.

As will be appreciated, objects are specific to the type of device executing the virtual machine software. Functions initiated as a result of the XML description may require event handling. This event handling is processed by the event handler 65 of the virtual machine 24 in accordance with the application definition file 28. Similarly, receipt of data from a mobile network will give rise to events. The event handler 65, associated with a particular application presented at the device, similarly processes incoming messages for that particular application. In response to the events, the virtual machine 24 creates instances of software objects and calls functions of those object instances, as required by the definitions contained within the XML definitions contained within the application definition file 28, giving rise to the event.

As noted, the virtual machine software 29 includes object classes, allowing the virtual machine 24 to create an object class instance corresponding to an <EVENT> tag. The event object classes include methods specific to the mobile device that allow the device to process each of the defined XML descriptions contained within the application definition file and also allow the device to process program/event flow resulting from the processing of each XML description.

Figure 10:
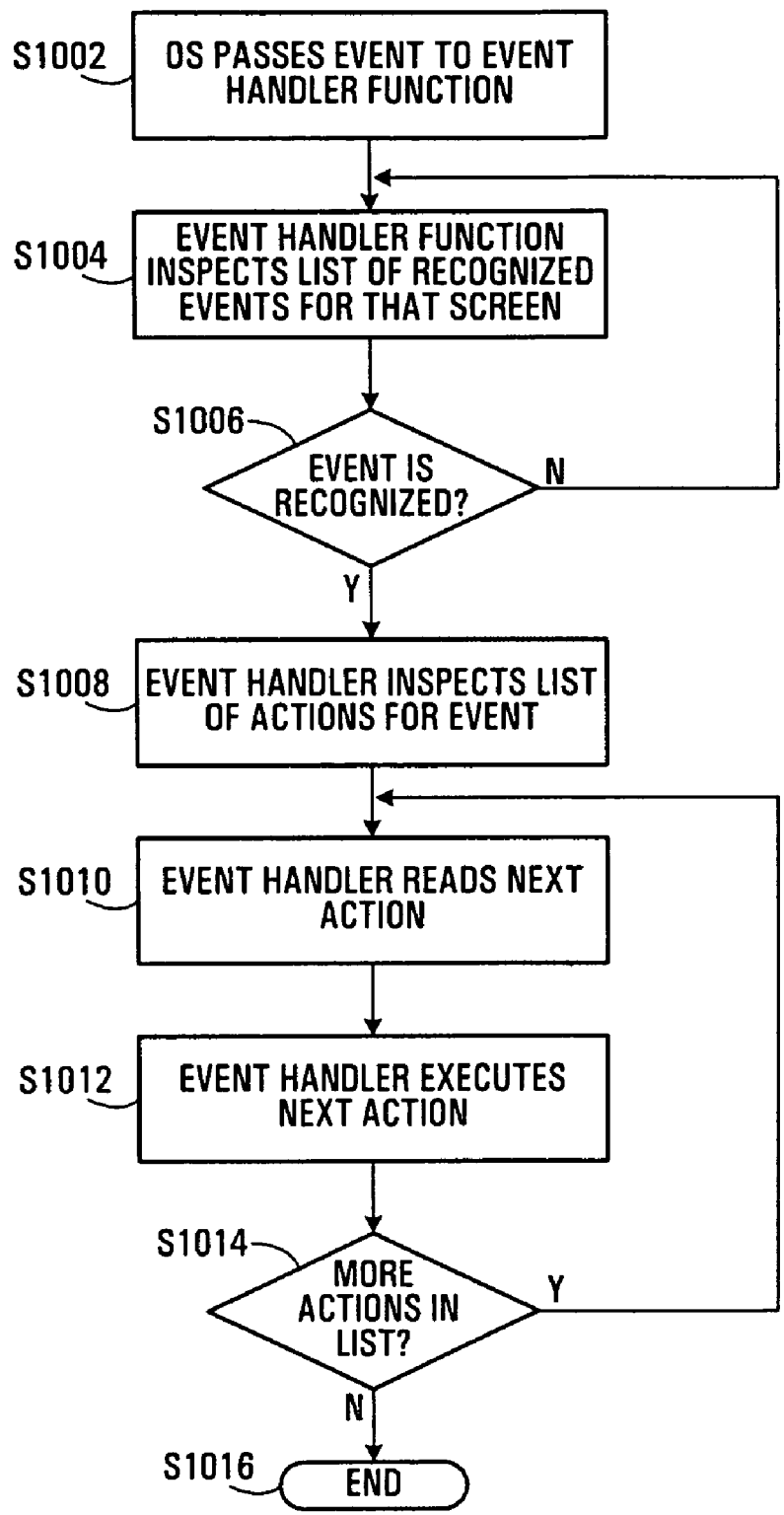
FIG. 10 illustrates steps performed at a mobile device under control of the virtual machine of FIG. 2.

Events may be handled by the virtual machine 24 as illustrated in FIG. 10. Specifically, as the event handler 65 has been registered with the operating system for created objects, upon occurrence of an event, steps S1002 and onward are performed in response to the operating system detecting an event.

An identifier of the event is passed to the event handler 65 in step S1002. In steps S1004-S1008, this identifier is compared to the known list of events, created as a result of steps S916-S930. For an identified event, actions associated with that event are processed in steps S1008-S1014. That is, the virtual machine 24 performs the action defined in the <ACTION> tag associated with the <EVENT> tag corresponding to the event giving rise to processing by the event handler 65. The <ACTION> may cause creation of a new screen, as defined by a screen tag, a network transmission, a local storage, or the like.

New screens, in turn, are created by invocation of the screen generation engine 67, as detailed in FIGS. 8 and 9. In this manner, the navigation through the screens of the application is accomplished according to the definition embodied in the application definition file.

Similarly, when the user wishes to communicate with the middleware server 44, or store data locally, the event handler 65 creates instances 69 of corresponding object classes of the virtual machine software 29 and calls methods of the instances to transmit the data, or store the data locally, using the local device operating system. The format of the data stored locally is defined by the local data definition section 52; the format of XML packages transmitted or received is defined in the network transaction package definition section 50.

For example, data that is to be sent to the wireless network is assembled into XML packages using methods of an instance of an XML builder object. Methods defined as part of the XML builder object allow creation of a full XML package before passing the completed XML package to an instance of a message server object. The message server object instance uses the device's network APIs to transmit the completed XML package across the wireless network.

XML packages received from the data network 63 (FIG. 6) give rise to events processed by the event handler 65. Processing of the receipt of XML packages is not specifically illustrated in FIG. 9. However, the receipt of a XML package triggers a "data" event recognized by the device operating system 20 (see FIG. 1). This data event is passed to the virtual machine 24 and the event handler 65 inspects the received XML package. As long as the data received is a valid XML data package as contained within the application definition file, the virtual machine 24 inspects the list of recognized XML entities.

So, for example, a user could trigger the transmission of a login request (data flow 80, FIG. 7) by interacting with an initial login screen, defined in the application definition file for the application. The login request (data flow 80) would be passed by the middleware server 44 to the backend application server 70. The backend application server 70, according to the logic embedded within its application, would return a login response (data flow 82), which the middleware server 44 would pass to the virtual machine 24. Other applications, running on the same or other application servers might involve different interactions, the nature of such interactions being solely dependent on the functionality and logic embedded within the backend application server 70 and remaining independent of the middleware server 44.

FIG. 11 illustrates example XML messages passed as part of the message flows illustrated in FIG. 7. For each message, the header portion, i.e., the portion enveloped by the <HEAD></HEAD> tag pair, is considered to contain a timestamp and an identifier of the sending device.

A first example message 72 is representative of a message sent by the mobile device 10 to request the list of applications that the middleware server 44 has available to that user on that device. The first example message 72 specifies a type for the mobile device 10 using text contained by the <PLATFORM></PLATFORM> tag pair. A second example message 74 is representative of a message sent, to the mobile device 10 by the middleware server 44, in response to the first example message 72. The second example message 74 contains a set of <APP></APP> tag pairs, each tag pair enveloping an identity of a single application that is available to the user at the device 10. A third example message 76 is representative of a message sent from the mobile device 10 to the middleware server 44 to request registration for a single server-side application. The tags specify information about the user and the mobile device 10. A fourth example message 78 is representative of a message sent, to the mobile device 10 by the middleware server 44, in response to the third example (registration request) message 76. The <VALUE><VALUE> tag pair envelope a code indicating success or failure. In the fourth example message 78 shown, a success is indicated by "CONFIRM" and is followed by an interface description for the application, enveloped by the <INTERFACE></INTERFACE> tag pair. This interface description may then be stored locally within the storage memory 16 of the mobile device 10.

As noted, when a user starts an interface to an application, an application definition file for which has been downloaded in the manner described above, the virtual machine 24 reads the interface description section of the application definition file. The virtual machine 24 identifies the screen that should be displayed on startup and displays the elements of the screen as detailed in relation to FIGS. 9 and 10. The user may then use the functionality defined by the application definition file to send XML packages to, and receive XML packages from, the associated backend application server via the middleware server 44.

Figure 12:
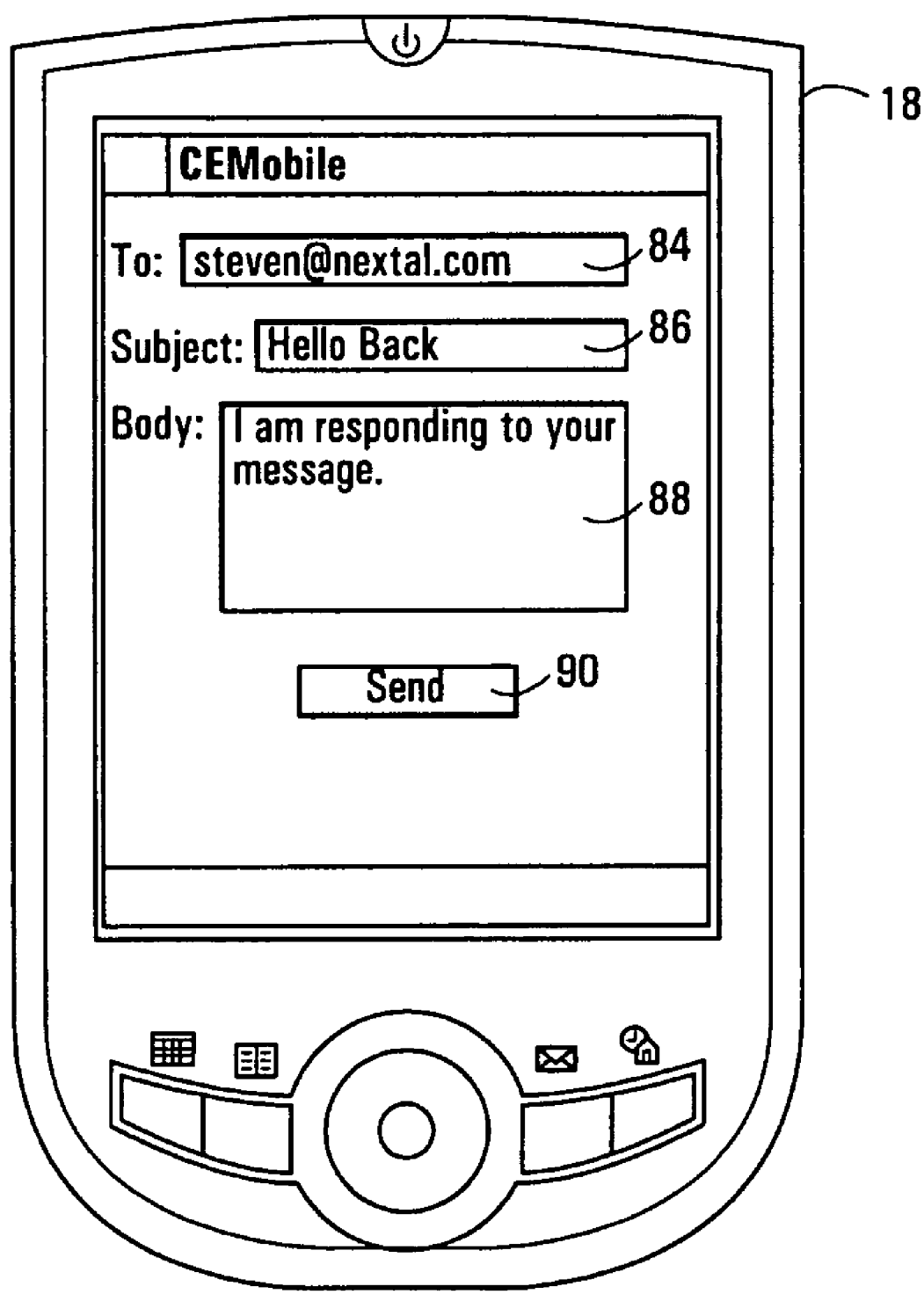
FIG. 12 illustrates a presentation of a user interface for a sample application at a mobile device.
Figures 13, 14:
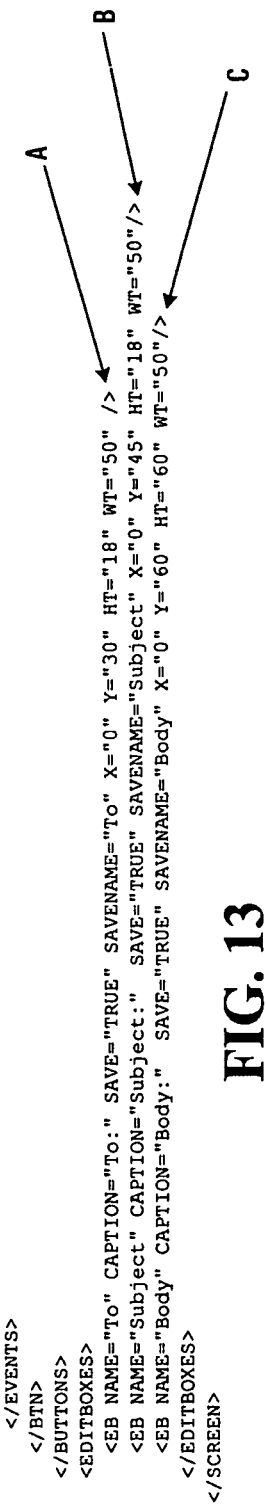
FIG. 13 illustrates a sample portion of an application definition file defining the user interface illustrated in FIG. 12.
FIG. 14 illustrates the format of a message formed in accordance with the sample portion of the application definition file of FIG. 13.

For the purposes of illustration, FIGS. 12 and 13 illustrate the presentation of a user interface for a sample screen on a Windows CE Portable Digital Assistant. As illustrated in FIG. 13, a first XML portion 92 of the application definition file 28 is an interface description for a screen with the name "NewMsg". This interface description may be contained within the user interface definition section 48 of the application definition file 28 associated with the server-side application. The screen is defined to have a single button identified by a <BTN> tag, which is identified as item D in FIG. 13, with attributes NAME="OK", CAPTION="Send", INDEX="0", X="0", Y="15", HT="18" and WT="50". This button gives rise to a single event (identified by the <EVENTS> tag) that has two associated actions: one defined by the <ACTION> tag with attribute TYPE="SAVE"; and one defined by the <ACTION> tag with attribute TYPE="ARML". The latter action results in the generation of an XML package (defined by the <PKG> tag with attribute TYPE="ME"), which has a data format as defined enveloped by the <PKG></PKG> tag pair. The package is defined to begin with a <MAIL> TAG with attributes MSGID, FROM and SUBJECT. Additionally, the interface description for the screen includes definitions for three edit boxes, as enveloped by the <EDITBOXES></EDITBOXES> tag pair. The definitions for the three edit boxes are identified in FIG. 13 as lines of XML code labeled A, B and C.

Upon invocation of the interface to the server-side application at the mobile device 10, the screen generation engine 67 of the virtual machine 24 processes the interface definition for the screen, as detailed with reference to FIGS. 8 and 9. That is, for XML tag D, the screen generation engine 67 creates a button object instance in accordance with steps S804-S812. Similarly for XML tag pairs A, B and C within the application definition file 28, the virtual machine 24 creates instances of edit box objects (i.e., steps S834-S842, see FIGS. 8 and 9). The data contained within the object instances reflects the attributes of the relevant button and edit box tags, contained in the application definition file 28 associated with the server-side application.

The resulting screen presented by the user interface 18 of the mobile device 10 is illustrated in FIG. 12. The user interface 18 depicts a screen called "NewMsg", which uses interface items that provide a user with an ability to compose and send data. The screen illustrated in FIG. 12 has an edit box named "To" 84 corresponding to XML tag pair A in FIG. 13, an edit box named "Subject" 86 corresponding to XML tag pair B in FIG. 13 and an edit box named "Body" 88 corresponding to XML tag pair C in FIG. 13. The screen illustrated in FIG. 12 also incorporates a button named "OK" 90 corresponding to XML tag D in FIG. 13.

Call-backs associated with the OK button 90 cause graphical user interface application software, as part of the operating system at the mobile device 10, to return control to the event handler 65 of the virtual machine 24. Thus, as the user interacts with the user interface 18, the user may input data within the presented screen using the mobile device API. Once data is to be exchanged with the middleware server 44, the user may press the OK button 90 and, by doing so, invoke an event, which is initially handled by the operating system of the mobile device 10. However, during the creation of the OK button 90, in steps S804-S810, any call-back associated with the button was registered to be handled by the event handler 65 of the virtual machine 24. Upon completion, the virtual machine 24 receives data corresponding to the user's interaction with the user interface 18 and packages this data into an XML package using corresponding objects. The XML package is populated according to the rules within the application definition file 28.

The event handler 65, in turn, processes the event caused by user interaction with the OK button 90 in accordance with the <EVENT> tag and corresponding <ACTION> tag associated with the <BTN> tag, referenced as XML tag D, associated with the OK button 90. The events, and associated actions, are listed as data items associated with the relevant user interface item within the application definition file 28. The <ACTION> tag causes the virtual machine 24 to create an instance of an object that forms an XML package for transmission to the middleware server 44 in accordance with the format defined within the <ACTION></ACTION> tag pair. That is, a "template" (defined beginning with the <PKG> tag with attribute TYPE="ME") for the XML package to be sent is defined within the <EVENT></EVENT> tag pair for a given user interface item. This template specifies the format of the XML package to be sent and may include certain variable fields. The variable fields in the formatted XML package take on contents that vary according to the values received in data entry fields on the current and previous screens. The definition of the template specifies which data entry field should be interrogated to populate a given variable field within the XML package that is to be sent.

According to the template, some of the variable fields of the XML package are filled dynamically from data inserted by the user into edit boxes presented on the display of the mobile device 10. The template includes placeholders delimited by square brackets, i.e., "["and"]". These placeholders reference a data source from which data for filling the corresponding section of the template should be obtained. A suitable data source might be a user interface field on the current screen, a user interface field on a previous screen or a table in a device-based logical database. The virtual machine 24, after reading the data source name, searches for the field corresponding to the referenced data source and replaces the placeholder with data contained within the named field. For example, the SUBJECT attribute of the <MAIL> tag in the first XML portion 92 references [NewMsg.Subject]. As such, content for the SUBJECT attribute may be read from the edit box (field) named "Subject" on the screen named "NewMsg". This process is repeated for each such placeholder, until the virtual machine 24, reading through the template, has replaced all placeholders in the template with content to form an XML package.

An exemplary XML package 94, containing data obtained as a result of input provided to the fields of the "NewMsg" screen, is illustrated in FIG. 14. The exemplary XML package 94 may have been created responsive to user interaction with the "NewMsg" screen, which user interaction may be considered to have been culminated by interaction with the OK button 90 (see FIG. 12) corresponding to XML tag D in the first XML portion 92. In this case, the user has entered: the text "steven@nextair.com" into the edit box named "To" 84; the text "Hello Back" into the edit box named "Subject" 86; and the text "I am responding to your message" into the edit box named "Body" 88.

The virtual machine 24, using the template, inspects these three edit boxes and places the text contained within each edit box in the appropriate position in the template. For example, the placeholder [NewMsg.Subject] is replaced by "Hello Back". The virtual machine 24 creates the exemplary XML package 94 by invoking functionality embedded within an XML builder software object to populate the variable fields of the template contained in the first XML portion 92. Once the exemplary XML package 94 has been assembled in this fashion, a relevant method of the message server object is invoked to transmit the exemplary XML package 94 across the network.

When an XML package is received, the event handler 65 of the virtual machine 24 is notified. In response, the virtual machine 24 instructs the XML parser 61 to build a list of name value pairs contained within the received XML package. Thereafter, methods within an object class for processing incoming XML packages are invoked that allow the virtual machine 24 to inspect the XML package to determine a server-side application to associate with the XML package and select a corresponding application definition file. The methods within the object class for processing incoming XML packages also allow the virtual machine 24 to inspect the application definition file to identify the fields in the device-based logical database and the user interface screens that may need to be updated with new data received in the XML package. In the case wherein the user interface screens are updated, such updating may be accomplished according to the procedures normal to the particular device.

Handling of incoming XML packages is defined in the application definition file 28. That is, for each of the possible XML packages that can be received, the application description file 28 includes definitions of device-based logical database tables and screen items that should be updated, as well as which section of the package updates which device-based logical database table or screen item. After an XML package has been received, the event handler 65 uses rules based on the application description file 28 to identify which device-based logical database tables or screen items need to be updated.

FIGS. 15A-15C illustrate how the format of the logical database in the local storage 26 on the device 10, and the XML packages that update the logical database, are defined in the application definition file 28. A second XML portion 96 of the application definition file 28, illustrated in FIG. 15A, forms part of the local data definition section 52 (see FIG. 4). The second XML portion 96 defines an example format for a portion of the logical database related to the e-mail application interface described with reference to FIGS. 12 and 13.

Two example tables are defined in the second XML portion 96 of FIG. 15A for formatting the logical database for the e-mail application. A first XML item E of the second XML portion 96 corresponds to a first table, labeled "SENT-ITEMS" in FIG. 15B. A second XML item F of the second XML portion 96 corresponds to a second table, labeled "RECIPIENTS" in FIG. 15B. The first table stores details of sent e-mail messages and has four fields. The second table stores recipients of sent e-mail messages and has three fields.

FIGS. 15A and 15B illustrate the use of the local storage 26 to store data related to XML packages that are sent and received. Specifically, the first table, defined by the first XML item E in FIG. 15A, may store the e-mail message contained in the exemplary XML package 94, shown in FIG. 14. Accordingly, the application definition file 28 for the e-mail application may be required to contain, along with the first XML portion 92 and the second XML portion 96, a third XML portion 102, illustrated in FIG. 15C. The third XML portion 102 defines how the data packages, composed according to the template included in the first XML portion 92 (see FIG. 13), lead to updates of the tables defined by the second XML portion 96.

The third XML portion 102 includes a first section 104 and a second section 106. The first section 104 defines how fields of a received XML package may be used to update the first table of FIG. 15B. An example line 108 defines how the "MSGID" field of the received XML package may be used to update a field named "LNGMESSAGEID" in the first table of FIG. 15B. Similarly, the second section 106 defines how the fields of the received XML package may be used to update fields of the second table of FIG. 15B.

The third XML portion 102 is contained by an <AXDATAPACKET></AXDATAPACKET> tag pair. Attributes of the <AXDATAPACKET> tag provide rules that indicate to the virtual machine 24 whether data contained within an XML package of a given XML package type should be used to update tables in the device-based logical database. These rules may be applied whenever an XML package of the given XML package type is sent or received.

As can be seen from the preceding description and example, such an approach has significant advantages over traditional methods of deploying applications onto mobile devices. First, the definition of an application's functionality is separated from the details associated with implementing such functionality, thereby allowing the implementers of a mobile application to concentrate on the functionality and ignore implementation details. Second, application definition files can be downloaded wirelessly, wherever the device happens to be at the time at which the functionality is required. This greatly improves the usefulness of the mobile device, by removing reliance on returning the device to a cradle and running a complex installation program. Third, the use of application definition files allows flexible definitions for numerous applications. Server-side applications may be easily ported to a number of device types.

As stated above, by describing a mobile application by way of an application definition file, a given mobile application is allowed to be developed independent of the platform on which the given mobile application will be executed. In the case of each type of platform, the mobile application is executed on a platform-specific virtual machine according to interpretation of an application definition file. In contrast, each type of platform is expected to have native mobile device applications, i.e., applications that have been coded specifically for the relevant platform. Java Platform, Micro Edition or Java ME, falls between these two types of applications. On one hand, a Java ME application arrives at a mobile communication device as an executable in the manner that a native mobile device application arrives. On the other hand, a Java ME application is executed by a virtual machine in a manner similar to the execution of a mobile application described by an application definition file. A mobile application described by an application definition file differs from a Java ME application in that there is a requirement to interpret the application definition file to produce the mobile application rather than simply running the executable Java ME application.

One aspect that native mobile device applications and Java ME applications have in common is metadata that allows the mobile device, upon receipt of the executable application, to provide values to variables of an application descriptor file. The application descriptor file may be used by the operating system of the mobile device to add an icon to a main screen (a main "ribbon") of icons that are presented to the user of the mobile device to allow the selection of an application to execute. The variables of the application descriptor file are known to include such metadata as an icon to display on the main screen and a Universal Resource Identifier pointing to the executable mobile application. An exemplary structure for an application descriptor file follows:

```
ApplicationDescriptor begin
    Long moduleHandle;
    Bitmap applicaitonIcon;
    Int ribbonPosition;
    String startupParameters
ApplicationDescriptor end
```

"moduleHandle" identifies the file that is to be executed.

"applicationIcon" is the icon to be displayed at the main application ribbon.

"robbonPosition" is the position where the application icon will be displayed on the ribbon.

"startupParameters" are the parameters that should be passed to the application when this application descriptor is selected.

As originally planned, launching a mobile application described by an application definition file, of the type discussed above, required the selection of a virtual machine icon on the main screen first, thereby launching the virtual machine, and, second, the selection of the mobile application that is to be launched from a list of mobile applications. This two-step mobile application launching method is inconsistent with the manner in which native mobile device applications, and Java ME applications, are typically launched, i.e., by the selection of a representative icon in the main screen. Unfortunately, if it does not occur to a user of a mobile device on which such application-definition-file-described mobile applications are loaded, to launch the virtual machine, the user may not become aware that the application-definition-file-described mobile applications are available.

In overview, by specifying the appropriate metadata (e.g., an image and an application location), an application definition file may provide the virtual machine with all the information necessary to create an application descriptor file. The application descriptor file may then be used by the operating system of the mobile device when preparing and displaying the main ribbon. A user may then select an icon on the main ribbon to launch an application-definition-file-described mobile application in the same manner that native mobile device applications and Java ME applications are launched.

The metadata for use in providing values to variables of the application descriptor file may, when the application definition file is encoded in XML, be specified as attributes of the root element of the application definition file. For example:

```
<application uri="/KamenMoney" name="KamenMoney"
entry="script_Start" vendor="Kamen Co." version="1.1.75"
size="6.16.11.5186" icon="exampleIcon.png">
.
.
.
(rest of application definition file)
.
.
.
</application>
```

Based on the above application definition file root element attributes, an exemplary application descriptor file may appear as follows:

```
ApplicationDescriptor begin
    Long virtualMachineHandle;
    Bitmap exampleIcon.png;
    Int defaultribbonPosition;
    String KamenMoney;
ApplicationDescriptor end
```

In the exemplary application descriptor file, the moduleHandle variable refers to a software handle for the virtual machine 24, the applicationIcon variable is assigned exampleIcon.png, as a ribbon position is not specified in the attributes of the root element of the application definition file, a defualt position is used and the name of the application to be executed is specified as a startup parameter.

Among the attributes of the root element, the attribute named "icon" is a reference to an image in PNG format. The format of the image is, of course, not limited to PNG and may be specific to a particular implementation. Any standard format for graphic data may be used, i.e., JPG, GIF, SVG, etc. In this particular example, the icon reference is a local reference and a file named "exampleIcon.png" should be downloaded together with the application definition file. In one instance, both the application definition file and the image file can be bundled together in a single archive file. To optimize transmission efficiency, the archive file may be compressed using a known compression scheme, such as PKZIP®.

Also among the attributes of the root element, the value of the attribute named "uri" is a Universal Resource Identifier referring to a location on the mobile device at which the application definition file may be located by the virtual machine 24. Furthermore, among the attributes of the root element, the value of the attribute named "name" provides a textual name for the application defined by the application definition file.

Figure 16:
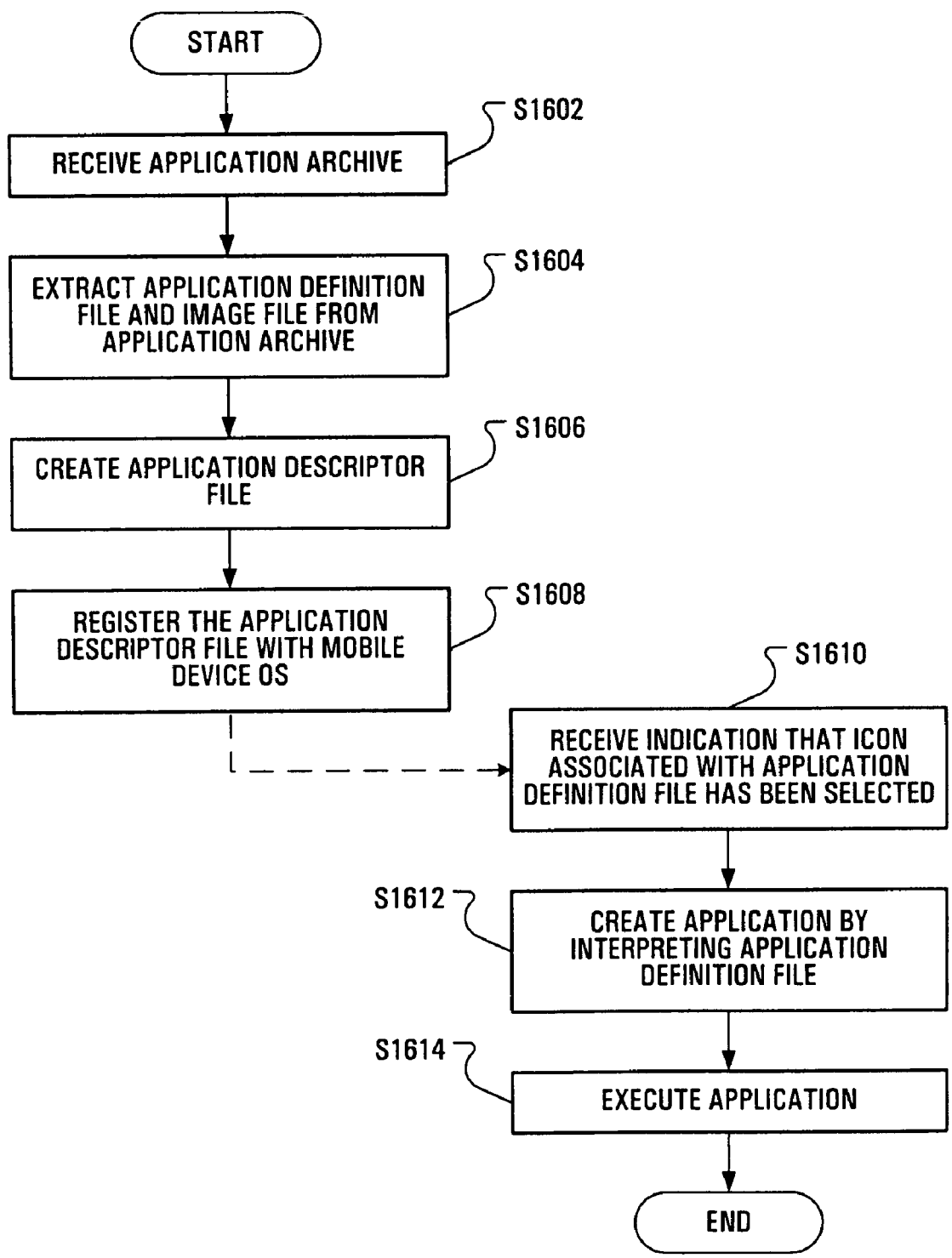
FIG. 16 illustrates steps of an exemplary method of executing an application at a virtual machine.

In operation, in view of FIG. 16, the mobile device 10, or more particularly the virtual machine 24, receives an application archive (step S1602) including an application definition file and an image file. The virtual machine 24 then extracts (step S1604) the application definition file and the image file from the application archive. Based on the metadata in the application definition file, the virtual machine 24 creates an application descriptor file (step S1606) and registers the application descriptor file (step S1608) with the operating system of the mobile device 10.

In creating the application descriptor file, the virtual machine 24 may, based on the value of the "icon" attribute of the root element of the application definition file, specify in the application descriptor file an image file to be associated with the application definition file in the main ribbon. Furthermore, the virtual machine 24 may, based on the value of the "name" attribute of the root element of the application definition file, specify in the application descriptor file a name to be associated with the image taken from the image file and displayed in the main ribbon. Additionally, the virtual machine 24 may, based on the value of the "uri" attribute of the root element of the application definition file, specify in the application descriptor file a location for the application definition file to be associated with the image taken from the image file and displayed in the main ribbon.

Figure 17:
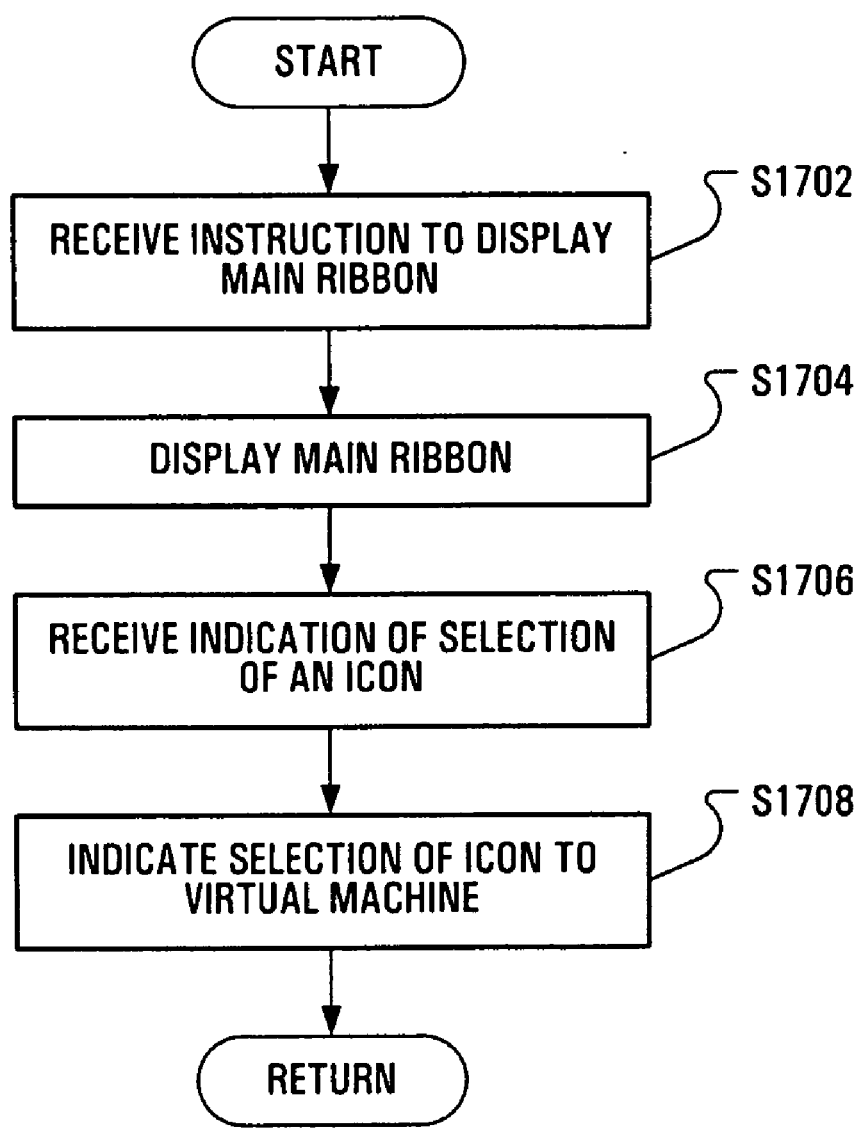
FIG. 17 illustrates steps of an exemplary method of responding, at a mobile device operating system, to the selection of an icon associated with an application definition file for executing on a virtual machine.

Operation of the device operating system software 20 after the registration of a new application descriptor file is illustrated in FIG. 17. Upon receiving an instruction (step S1702) to present the main ribbon, the device operating system software 20 displays a main ribbon (step S1704) that includes a given icon based on the image file referred to in the application descriptor file.

When a user has focused attention on, but not yet selected, the given icon, the device operating system software 20 may, elsewhere on the screen, identify the application associated with the given icon by the text provided by the name attribute of the root element and then recorded in the application description file.

The device operating system software 20 then receives an indication (step S1706) that an icon on the main ribbon has been selected. Where the selected icon is the icon associated with the application definition file, the device operating system software 20 indicates the selection (step S1708) to the virtual machine 24.

Responsive to receiving (step S1610, see FIG. 16), from the device operating system software 20, the indication that the icon associated with the application definition file has been selected, the virtual machine 24 interprets the application definition file to create an application (step S1612). As discussed above, upon receipt of the application definition file, the virtual machine 24 may, using the XML parser 61, form a binary representation of the application definition file for storage at the mobile device 10, thereby eliminating the need to parse the text of the application definition file each time an application is used.

Creation of the application (step S1612) may, for instance, proceed as described above with reference to FIG. 8. In particular, the steps of FIG. 9 are undertaken to create a user interface item for each of steps S808, S818, S828, S838 and S848, if necessary. The virtual machine 24 then executes (step S1614) the newly created application. As described above, where the application is a client-side interface to a server-side application, creation (step S1612) and execution (step S1614) may be intermingled in that creation involves developing an interface in memory and then presenting the interface on the display of the device, as described with reference to FIGS. 8 and 9 and that execution involves recognizing events and executing actions associated with the recognized events, as described with reference to FIG. 10.

The creation of an application description file that is facilitated by the inclusion of metadata within a given application definition file allows the inclusion of a new icon on the main ribbon of a mobile device. The new icon is associated with the given application definition file, which describes a mobile application that is to be executed as a process that is an extension of an executing virtual machine. Advantageously, the new icon appearing in the main ribbon allows a user to initiate the execution of the associated application without taking the typical first step of opening a virtual machine interface. As such, initiating execution of the application is, to the user, no different than initiating the execution of an application native to the mobile device and, accordingly, the virtual machine for executing the mobile application is transparent to the user.

Other modifications will be apparent to those skilled in the art and, therefore, the invention is defined in the claims.

We claim:

1. A method of creating and executing an application on a wireless mobile device having an operating system and a virtual machine executed by said operating system, said virtual machine for interpreting application definition files defining applications in a markup language, said method comprising:
at said mobile device:
receiving an application definition file with metadata, said application definition file comprising said markup language and including:
a format of a user interface for said application at said mobile device;
a format of network messages for exchange of data generated by said application; and
a format for storing data related to said application at said mobile device, said metadata including:
a location at said mobile device for said application definition file; and
a reference to an image file representing an icon to be displayed at said mobile device and whose selection shall initiate execution of said application;
receiving said image file in association with said application definition file;
creating an application descriptor file based on said metadata, said creating comprising:
assigning, to a variable of said application descriptor file, said reference to said image file; and
specifying in said application descriptor file said location at said mobile device for said application definition file;
registering said application descriptor file with said operating system that is executing said virtual machine;
at said operating system:
responsive to said registering, presenting said icon based on said variable of said application descriptor file;
receiving an indication of selection of said icon;
indicating said selection to said virtual machine;
at said virtual machine:
responsive to said indicating, interpreting said application definition file to create an application; and
executing said application,
such that said virtual machine for executing said application is rendered transparent to a user of said mobile device.

2. The method of claim 1 wherein said registering includes storing said application descriptor file such that said application descriptor file may be read by said operating system.

3. The method of claim 1 wherein said indication of a location for said application definition file at said computing device includes a uniform resource locator.

4. The method of claim 1 wherein said application definition file is received associated with said image file in an archive file.

5. The method of claim 4 further comprising decompressing said archive file.

6. The method of claim 1 wherein said interpreting said application definition file to create an application presents a user interface to a server-side application.

7. The method of claim 1 further comprising, at said virtual machine, processing said application definition file to form a processed application definition file and wherein said interpreting interprets said processed application definition file.

8. The method of claim 1 wherein said receiving an application definition file, said creating, and said registering occur at said virtual machine.

9. A wireless mobile computing device comprising:
a processor;
memory in communication with said processor, storing software adapting said device to:
receive an application definition file with metadata, said application definition file comprising a markup language and including:
a format of a user interface for said application at said mobile device;
a format of network messages for exchange of data generated by said application; and
a format for storing data related to said application at said mobile device,
said metadata including:
a location at said mobile device for said application definition file; and
a reference to an image file representing an icon to be displayed at said mobile device and whose selection shall initiate execution of said application;
receive said image file in association with said application definition file;
create an application descriptor file based on said metadata, said creating comprising:
assigning, to a variable of said application descriptor file, said reference to said image file; and
specifying in said application descriptor file said location at said mobile device for said application definition file;
register said application descriptor file with an operating system that is executing a virtual machine for interpreting application definition files defining applications in said markup language;
execute said operating system to:
responsive to registration of said application descriptor file, present said icon based on said variable of said application descriptor file;
receive an indication of selection of said icon;
indicate said selection to said virtual machine;
execute said virtual machine to:
interpret, responsive to receiving an indication of said selection, said application definition file to create an application; and
execute said application,
such that said virtual machine for executing said application is rendered transparent to a user of said mobile device.

10. The computing device of claim 9 wherein said software further adapts said device to: store, as part of registering, said application descriptor file such that said application descriptor file may be read by said operating system.

11. The computing device of claim 9 wherein said indication of a location for said application definition file at said computing device includes a uniform resource locator.

12. The computing device of claim 9 wherein said software further adapts said device to receive an archive file including said application definition file and said image file.

13. The computing device of claim 12 wherein said software further adapts said device to decompress said archive file.

14. A computer-readable medium storing software that, upon execution by a processor of a wireless mobile device having an operating system and a virtual machine executed by said operating system, said virtual machine for interpreting application definition files defining applications in a markup language, configures said device to:
- receive an application definition file with metadata, said application definition file comprising said markup language and including:
  - a format of a user interface for said application at said mobile device;
  - a format of network messages for exchange of data generated by said application; and
  - a format for storing data related to said application at said mobile device,
- said metadata including:
  - a location at said mobile device for said application definition file; and
  - a reference to an image file representing an icon to be displayed at said mobile device and whose selection shall initiate execution of said application;
- receive said image file in association with said application definition file;
- create an application descriptor file based on said metadata, said creating comprising:
  - assigning, to a variable of said application descriptor file, said reference to said image file; and
  - specifying in said application descriptor file said location at said mobile device for said application definition file;
- register said application descriptor file with said operating system that is executing said virtual machine;
- at said operating system:
  - responsive to registration of said application descriptor file, present said icon based on said variable of said application descriptor file;
  - receive an indication of selection of said icon;
  - indicate said selection to said virtual machine;
- at said virtual machine:
  - responsive to receiving an indication of said selection, interpret said application
  - definition file to create an application; and
  - execute said application,
- such that said virtual machine for executing said application is rendered transparent to a user of said mobile device.

* * * * *